United States Patent
Arbab et al.

(10) Patent No.: US 12,146,790 B2
(45) Date of Patent: Nov. 19, 2024

(54) TERAHERTZ THREE-DIMENSIONAL SPECTRAL SCANNER APPARATUS AND METHOD OF USING SAME

(71) Applicant: The Research Foundation for The State University of New York, Albany, NY (US)

(72) Inventors: Mohammad Hassan Arbab, South Setauket, NY (US); Zachery Harris, Stony Brook, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 100 days.

(21) Appl. No.: 17/438,630

(22) PCT Filed: Mar. 11, 2020

(86) PCT No.: PCT/US2020/022084
§ 371 (c)(1),
(2) Date: Sep. 13, 2021

(87) PCT Pub. No.: WO2020/185886
PCT Pub. Date: Sep. 17, 2020

(65) Prior Publication Data
US 2022/0221335 A1  Jul. 14, 2022

Related U.S. Application Data

(60) Provisional application No. 62/816,552, filed on Mar. 11, 2019.

(51) Int. Cl.
*G01J 3/02* (2006.01)
*G01J 3/06* (2006.01)
*G01N 21/3586* (2014.01)

(52) U.S. Cl.
CPC ............ *G01J 3/021* (2013.01); *G01J 3/0208* (2013.01); *G01J 3/0272* (2013.01);
(Continued)

(58) Field of Classification Search
None
See application file for complete search history.

(56) References Cited

U.S. PATENT DOCUMENTS 4,714,309 A * 12/1987 Woodcock ............... G03H 1/04
359/34
7,449,695 B2    11/2008 Zimdars et al.
(Continued)

FOREIGN PATENT DOCUMENTS

CN    102175662 A    9/2011
CN    103477188 A    12/2013
(Continued)

OTHER PUBLICATIONS

Yee et al. ("High-speed terahertz reflection three-dimensional imaging using beam steering", Opt. Ex, vol. 23 (4), pp. 5027-5034) (Year: 2015).*
(Continued)

*Primary Examiner* — Hina F Ayub
(74) *Attorney, Agent, or Firm* — Scully, Scott, Murphy & Presser, P.C.

(57) ABSTRACT

Handheld, broadband terahertz (THz) scanners, housings therefor and imaging systems are provided. The scanner may comprise a 2-Dimensional (2D) gimbaled mirror for beam steering. The 2D gimbaled mirror may comprise a single mirror mounted in a frame, a first motor and a second motor. The first motor and the second motor may be coupled to the frame. The mirror may be rotatable in a first axis of rotation and a second axis of rotation to scan light on a target in two dimensions. The first motor corresponds to the first axis and
(Continued)

the second motor corresponding to the second axis. The 2D gimbaled mirror may be positioned within the housing such that the single mirror is positioned at a focus of a focusing lens. The focusing lens may be fixed within a housing. The scanner may also comprise a terahertz emitter and detector.

23 Claims, 26 Drawing Sheets
(26 of 26 Drawing Sheet(s) Filed in Color)

(52) U.S. Cl.
CPC ........ *G01J 3/0291* (2013.01); *G01N 21/3586* (2013.01); *G01J 2003/062* (2013.01); *G01N 2201/0221* (2013.01)

(56) References Cited

U.S. PATENT DOCUMENTS

| | | | |
|---|---|---|---|
| 7,828,438 | B1 | 11/2010 | Motamedi et al. |
| 8,253,619 | B2 | 8/2012 | Holbrook et al. |
| 8,593,157 | B2 | 11/2013 | Adams et al. |
| 9,476,695 | B2 | 10/2016 | Becker et al. |
| 9,529,083 | B2 | 12/2016 | Bridges et al. |
| 9,746,560 | B2 | 8/2017 | Steffey et al. |
| 9,784,838 | B1 | 10/2017 | Shpunt et al. |
| 10,082,521 | B2 | 9/2018 | Atlas et al. |
| 10,288,979 | B1 | 5/2019 | Wang et al. |
| 10,451,716 | B2 | 10/2019 | Hughes et al. |
| 11,953,604 | B2 | 4/2024 | Kimura et al. |
| 2010/0117885 | A1 | 5/2010 | Holbrook et al. |
| 2011/0168891 | A1* | 7/2011 | van der Weide .. G01N 21/3563 250/334 |
| 2012/0273681 | A1 | 11/2012 | Schulkin et al. |
| 2015/0205094 | A1 | 7/2015 | West |
| 2015/0219875 | A1* | 8/2015 | Bansal ............... G02B 26/0841 318/116 |
| 2015/0241204 | A1 | 8/2015 | Steffey et al. |
| 2015/0355317 | A1 | 12/2015 | Bridges et al. |
| 2016/0169659 | A1 | 6/2016 | Steffey et al. |
| 2017/0295323 | A1 | 10/2017 | Millar et al. |
| 2017/0370834 | A1 | 12/2017 | Kassab et al. |
| 2019/0129153 | A1* | 5/2019 | Knebel ................ G02B 21/367 |
| 2019/0150719 | A1 | 5/2019 | Jarrahi |
| 2019/0257642 | A1 | 8/2019 | Hillebrand |
| 2020/0033500 | A1 | 1/2020 | Trollmann et al. |
| 2020/0150420 | A1 | 5/2020 | Lee et al. |
| 2020/0292672 | A1 | 9/2020 | Wang et al. |

FOREIGN PATENT DOCUMENTS

| | | |
|---|---|---|
| CN | 104749130 A | 7/2015 |
| CN | 105259132 A | 1/2016 |
| CN | 109540835 A | 3/2019 |
| DE | 112012001709 B4 | 1/2016 |
| DE | 102017131102 A1 | 7/2018 |
| GB | 2 411 093 A | 8/2005 |
| JP | 2003114109 A | 4/2003 |
| JP | 5367298 B2 | 12/2013 |
| JP | 2015-087270 A | 5/2015 |
| JP | 2015532718 A | 11/2015 |
| JP | 6637827 B2 | 1/2020 |
| KR | 10-2019-0046112 A | 5/2019 |
| WO | 2005080947 A1 | 9/2005 |
| WO | 2014126649 A1 | 8/2014 |
| WO | 2019/007465 A1 | 1/2019 |

OTHER PUBLICATIONS

Lee E S et al., "Semiconductor-Based Terahertz Photonics for Industrial Applications", Journal of Lightwave Technology 36(2):274-283 (Jan. 15, 2018).

Suzuki D. et al., "A Flexible and Wearable Terahertz Scanner", Nature Photonics 10:809-813 (Dec. 2016).

Yee D-S et al., "High-Speed Terahertz Reflection Three-Dimensional Imaging Using Beam Steering", Optics Express 23(4):DOI:10.1364/OE.23.005027 (Feb. 23, 2015).

Zhang X-C et al., "Handheld THz Instrementation", The International Society for Optics and Photonics (2012).

International Search Report dated Jul. 16, 2020 issued in PCT/US2020/022084.

Katletz, S. et al., "Efficient terahertz en-face imaging", Optics Express, vol. 19, No. 23; Publication [online]. Oct. 28, 2011 retrieved May 6, 2020). Retrieved from the Internet: <URL: https://www.osapublishing.org/oe/abstract.cfm?uri=oe-19-23-23042>; pp. 23042-23053.

Amanti, M. et al., "Stand-alone system for high-resolution, real-time terahertz imaging", Optics Express, Jan. 30, 2012, pp. 2772-2778, vol. 20, No. 3.

* cited by examiner

Collar 300

10

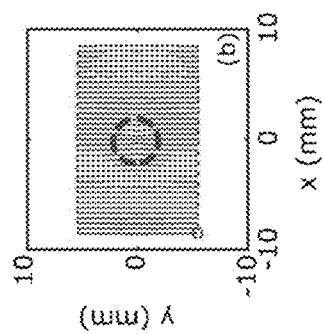
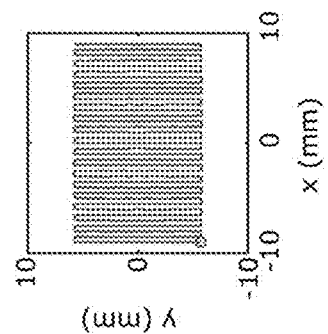
Fig. 7A
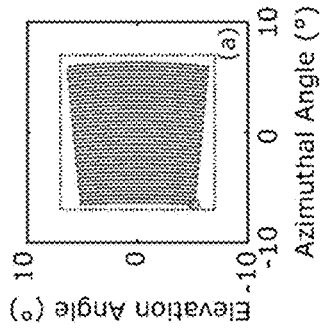
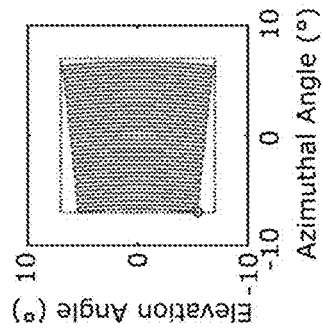
Fig. 7B

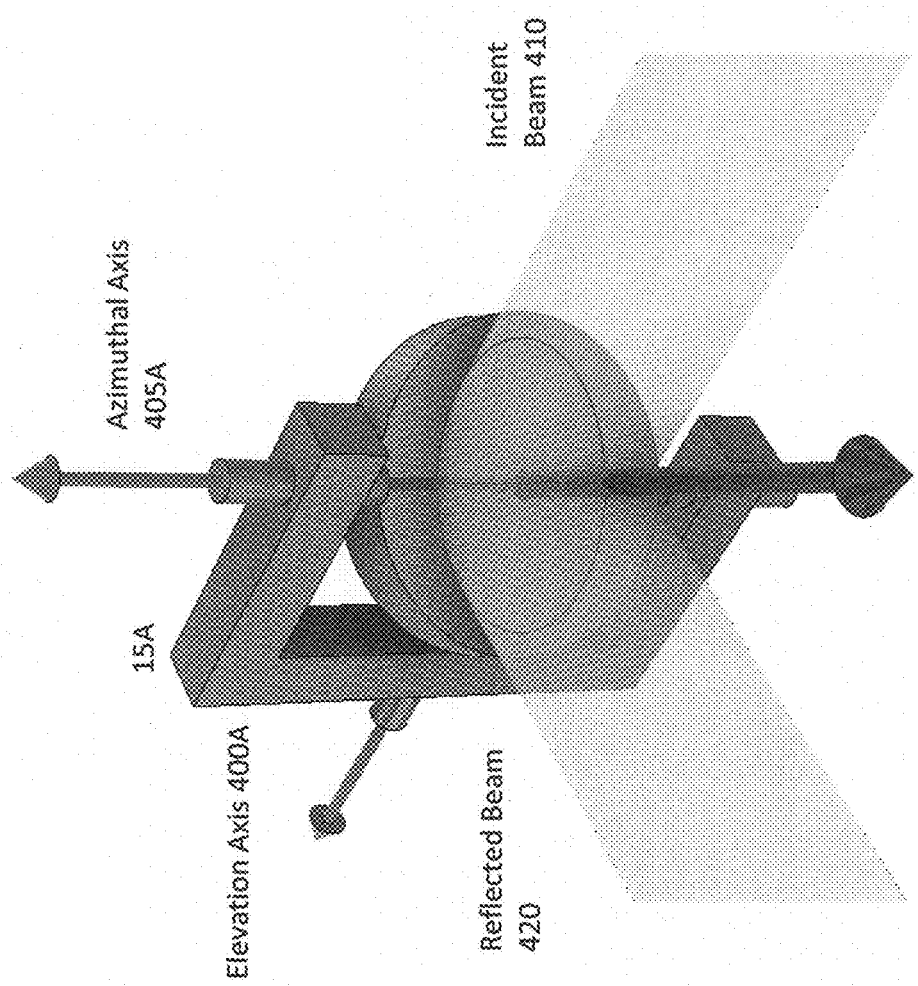

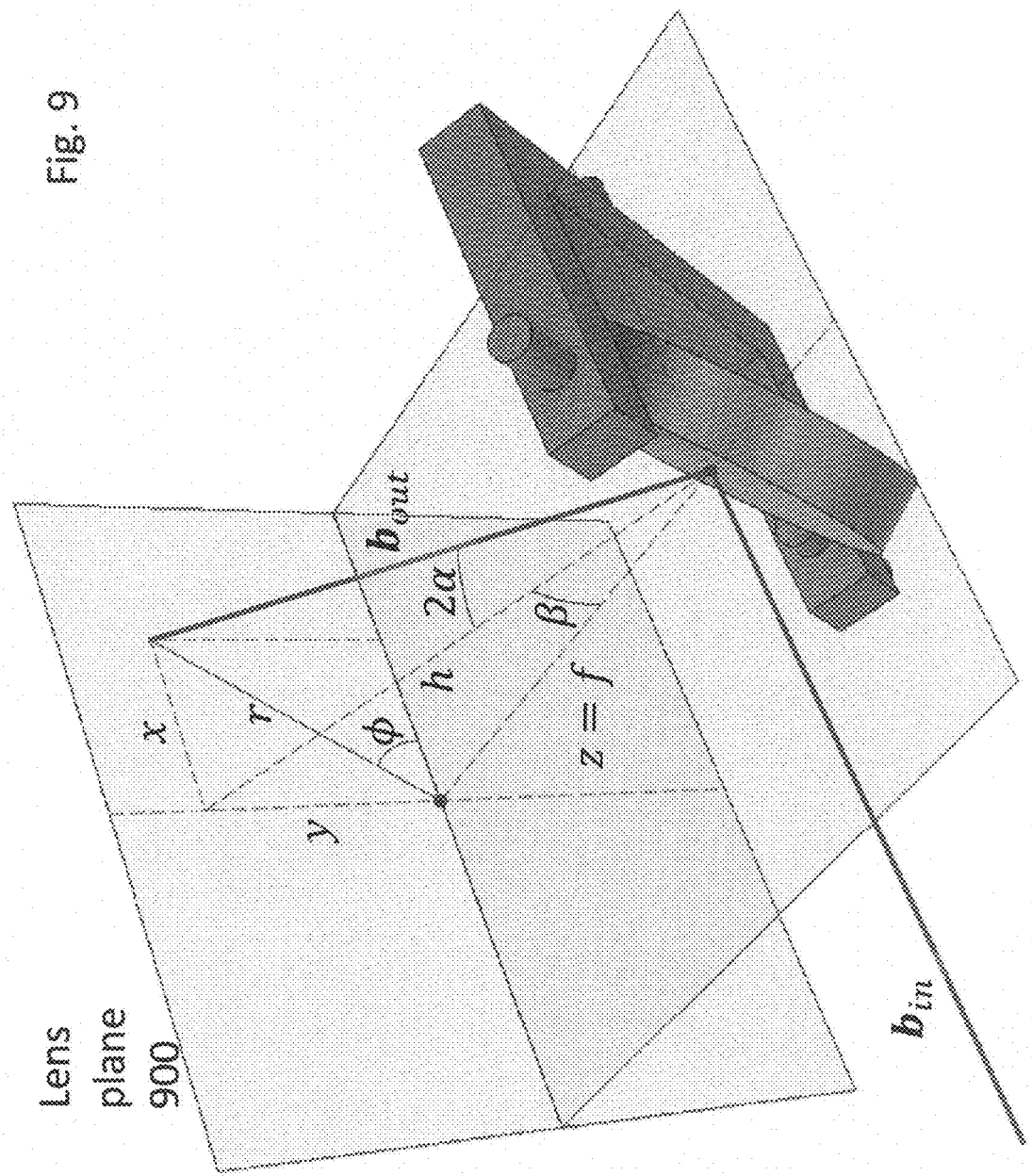

1050

1000

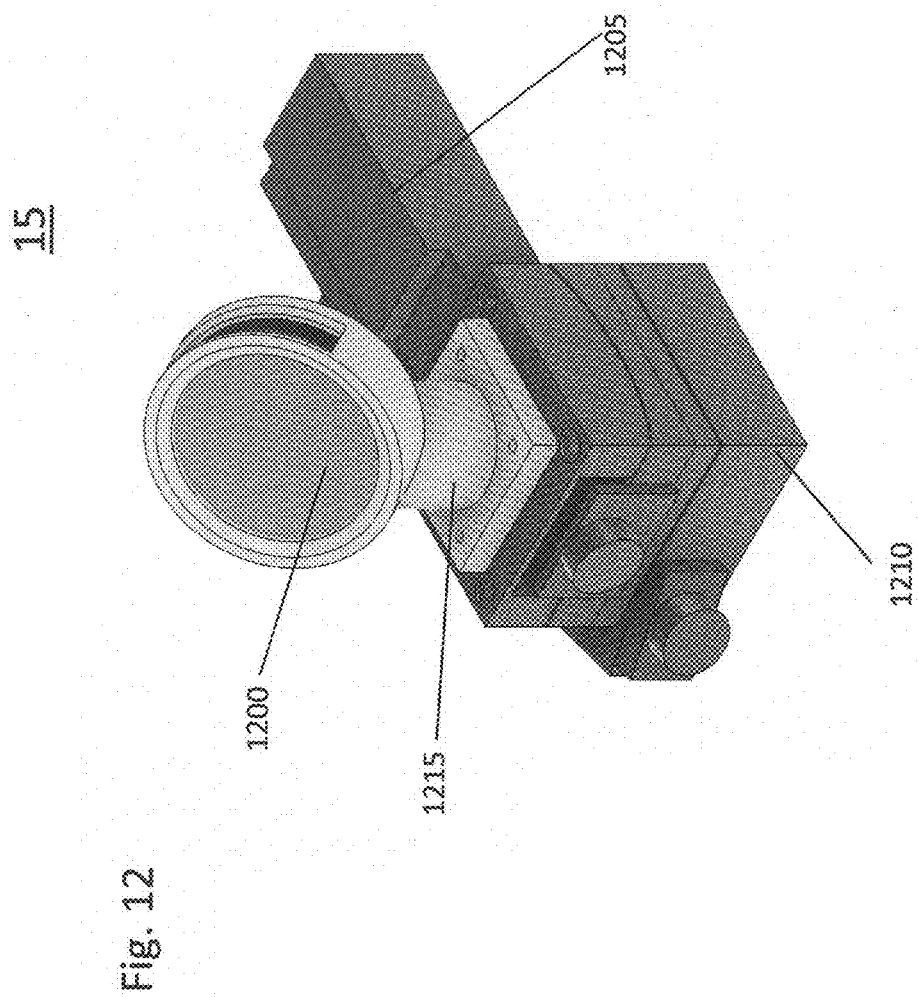

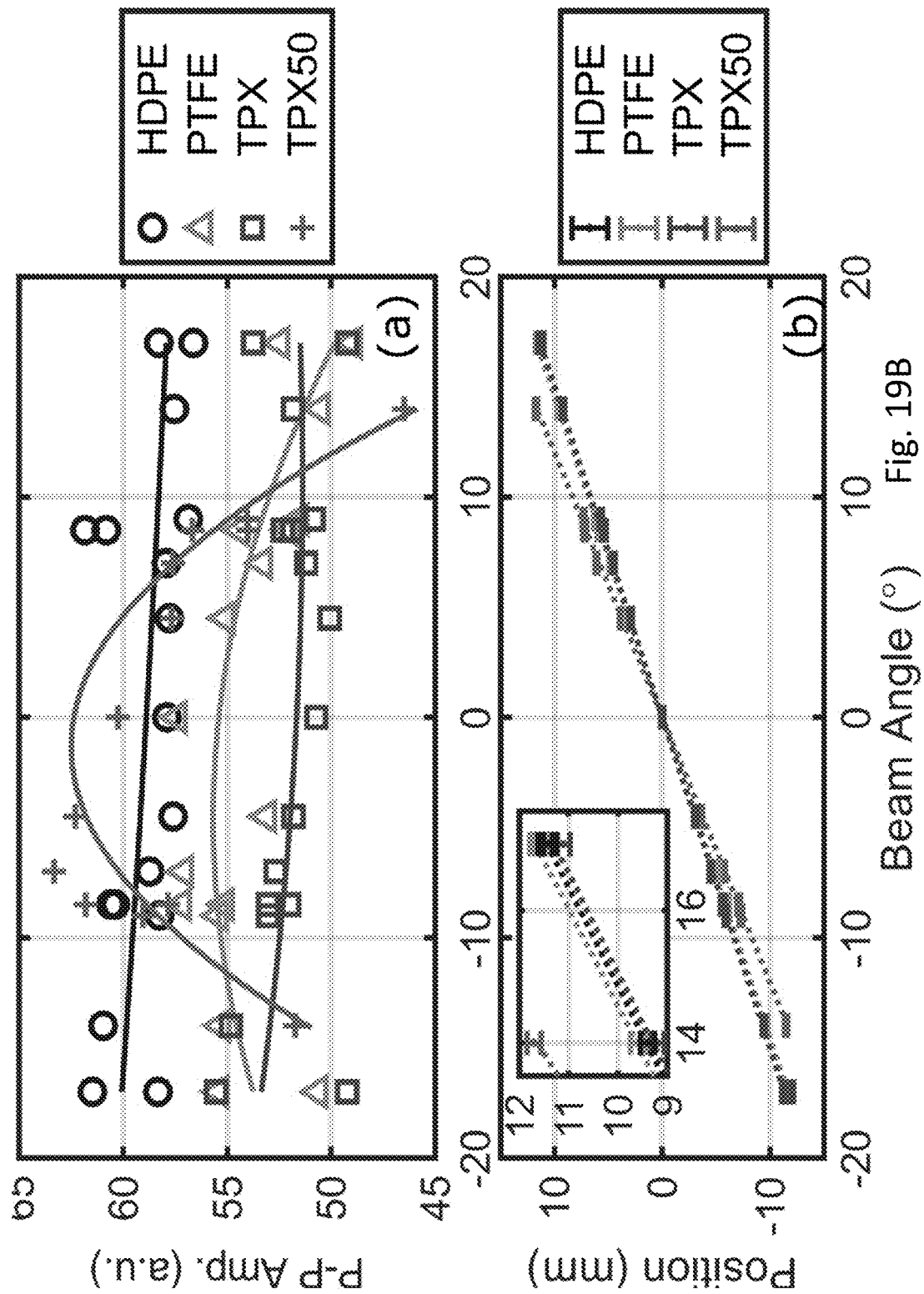

TERAHERTZ THREE-DIMENSIONAL SPECTRAL SCANNER APPARATUS AND METHOD OF USING SAME

CROSS REFERENCE TO RELATED APPLICATION

The present application claims benefit of U.S. Provisional Application No. 62/816,552, filed on Mar. 11, 2019, all of the contents of which are incorporated herein by reference.

GOVERNMENT SUPPORT

This invention was made with government support under GM112693 awarded by the National Institutes of Health. The government has certain rights in the invention.

FIELD OF THE DISCLOSURE

This disclosure relates to Terahertz spectral scanning. This disclosure also relates to housings for a handheld terahertz spectral scanning device.

BACKGROUND

Terahertz (THz) time-domain spectroscopy may be used for various applications. These applications may include non-destructive analysis, biomedical imaging for diagnosis of burn wounds and cancer margin delineation, art preservation and security, among other applications.

Accordingly, a wide variety of imaging modalities have been developed to serve these purposes. However, portable THz systems are still in their early stages of development. Existing THz cameras do not provide spectroscopic information, so many investigations use single-pixel techniques such as moving the target in front of a stationary THz time-domain spectroscopy (THz-TDS) setup to form spectral images. This strategy is only feasible for small, easily moved samples which can be brought to the system and is limited by problems of alignment and phase ambiguity in reflective imaging.

Single-pixel imaging techniques based on compressed sensing, which do not require such motion-controlled stages, have been employed but these methods require the entire sample area to fit within the collimated beam.

Other portable systems request motion stages in order to move a scanning head over a sample or only acquire a single row of pixels. However, systems in which a single-detector scanning head is moved over a stationary target suffer similar alignment problems to moving-target systems.

SUMMARY

Accordingly, disclosed are handheld, broadband terahertz (THz) multiple dimensional scanners.

In some aspects, the scanner may comprise a lens for focusing light on a target, a 2-Dimensional (2D) gimbaled mirror, an emitter and a detector. The lens may be fixed in position in a housing. The 2D gimbaled mirror may comprise a single mirror mounted in a frame, a first motor and a second motor. The first motor and the second motor may be coupled to the frame such that the mirror is rotatable in a first axis of rotation and a second axis of rotation under a control of a motor controller and system controller to scan light on the target in two dimensions. The first motor corresponds to the first axis and the second motor corresponds to the second axis. The single mirror may be positioned at a focus of the lens. In some aspects, the first axis may be orthogonal to the second axis.

In some aspects, the lens may be is a rotationally-symmetric f-theta (f-θ) lens. The f-θ lens may be formed from a high-density polyethylene and may be broadband. For example, in some aspects, the rotationally-symmetric f-θ lens may have a bandwidth of about 0.1 to about 1.6 THz, where the center frequency is about 0.5 THz.

In some aspects, the lens may have a depth of focus of at least 2 mm.

In some aspects, the time of arrival of the reflected light at the detector is substantially independent of angles of rotation and/or the spot size of the light at a focal length of the lens is substantially independent of angles of rotation.

In some aspects, the scanner may further comprise a beam splitter positioned to direct a portion of the light emitted by the emitter toward the single mirror and a portion of the reflected light by the target toward the detector.

In some aspects, the emitter may comprise a photoconductive antenna and the detector may comprise a photoconductive antenna. The emitter may be excited at a wavelength range selected from a group consisting of 1300, 1550 and 1600 nm.

In some aspects, the emitter and detector are respectively coupleable to lasers via respective cables.

In some aspects, the beam steering of the 2D gimbaled mirror is based on a rotational relationship between the first axis and the second axis and properties of the lens. In other aspects, the beam steering of the 2D gimbaled mirror is based on the properties of the lens.

In some aspects, the first motor and the second motor are connected to the frame such that rotation in the first axis is substantially uncoupled of rotation in the second axis.

In some aspects, the emitter and detector may be positioned orthogonal from each other.

In some aspects, the scanner may further comprise a fixed mirror positioned to direct the light reflected from the target toward the detector.

In some aspects, the scanner may further comprise a collimating lens positioned adjacent to the emitter and detector, respectively.

Also disclosed is an imaging system. The imaging system may be a broadband terahertz (THz) multiple dimensional imaging system.

The imaging system may comprise a handheld scanner having at least some of the aspects described above, connecting cables, the motor controller, the system controller and a display.

For example, fiber optic cables may connect the emitter and the detector, respectively, to laser(s).

A signal cable(s) may connect the detector to the system controller, directly or indirectly and a power cable(s) may connect the emitter to the system controller.

The motor controller may be coupled to the first motor and the second motor and the system controller. The motor controller may be configured to cause the first motor and the second motor to cause the mirror to rotate about the first axis and the second axis to scan light on the target over a plurality of different positions in the two dimensions based on signals from the system controller.

The system controller may be configured to control the emitter to emit the light and generate an image of the target based on the reflected light detected by the detector. This image may be displayed.

In some aspects, the image may be an en-face image(s) or a three-dimensional image(s).

In some aspects, the system controller may be configured to scan the target using different scan modes. These scan modes include at least a first resolution mode and a second resolution mode, In the first resolution mode, a pixel size of the image is smaller than in the second resolution mode.

In some aspects, the field of view is at least 18 mm×12 mm.

Also disclosed are housings for the handheld scanners.

In some aspects, the housing may comprise a wall having a first opening at a distal end. A first projection may extend inward from the wall. The first projection may extend at least a portion around the circumference of the wall.

The housing may further comprise a registration surface. The wall may have a recess extending between the registration surface and the first projection. The first projection, the recess and the registration surface may define a space for mounting a focusing lens having a collar. When installed, the collar may be in contacted with the registration surface and the first projection. The registration surface and the first projection may be parallel to each other. In some aspects, the first projection may extend around the circumference of the wall and may have a padding mounted thereto.

In some aspects, the registration surface may be distal of the first projection.

The housing may further comprise an internal wall having a mount opening. The internal wall may be configured and dimensioned for mounting a motorized gimbaled mirror such that when mounted, the mirror of the motorized gimbaled mirror may be positioned at a focus of the lens. The internal wall and wall define a compartment dimensioned for the motorized gimbaled mirror to rotated in a first axis and a second axis.

The wall may have a second opening for receiving cables for the motorized gimbaled mirror, the second opening adjacent to the compartment. A handle may be formed from a portion of the wall.

The housing may further comprise a first curved wall and a second curved wall. These walls respective may have mount openings. The first curved wall may be dimensioned to receive an emitter and the second curved wall may be dimensioned to receive a detector. Both curved walls may be located within the handle.

The wall may have a third opening for receiving cables for the emitter and a fourth opening for receiving cables for the detector.

The housing may further comprise a mount angled with respect to a longitudinal axis of the first curved wall. The mount may comprise a first portion and a second portion. The first portion and the second portion may extend from the wall. The first portion and the second portion form a pocket for a beam splitter.

In some aspects, the housing may comprises a second mount. The second mount may be aligned with the mount and parallel thereto. The second mount may have first portion and the second portion extending from the wall. The first portion and the second portion form a pocket for a mirror.

In some aspects, the first portion of the mount may be an annular ring projecting from the wall and have padding around the annular ring.

In some aspects, the housing may further comprise an annular recess in the wall at the distal end. The annular recess may be dimensioned for receiving an imaging window.

In other aspects of the disclosure, the housing may comprise a base. The base may comprise a wall having a motorized gimbaled mirror mount for mounting a motorized gimbaled mirror where the motorized gimbaled mirror mount comprising projections from the wall and mounting opening. The wall may have a handle. The base may further comprise an emitter cable channel and a detector channel. The channels may extend from an opening in the base. At least one of the emitter cable channel and the detector cable channel is curved. The base may further have a first recess positioned at an end of the emitter cable channel and a second recess positioned at an end of the detector cable channel. The first recess may be dimensioned to receive a THz emitter and the second recess may be dimensioned to receive a THz detector. The longitudinal axis of the first recess may be orthogonal to the longitudinal axis of the second recess. The emitter cable channel may extend between the opening and the first recess and the detector cable channel may extend between the opening and the second recess. When the motorized gimbaled mirror is mounted to the motorized gimbaled mirror mount and the THz emitter is mounted to the first access, an axis of rotation of a mirror of the motorized gimbaled mirror may be parallel to a beam emitted by the THz emitter.

In some aspects, this housing may further comprise a motor cover. The motor cover may be mountable to the base. The motor cover may comprise a first opening and a second opening. When the motorized gimbaled mirror is mounted to the motorized gimbaled mirror mount, the first opening may be aligned with one motor of the motorized gimbaled mirror and the second opening may be aligned with the other motor. The first opening may be dimensioned to receive a cable and enable movement of the cable when the one motor rotates. In some aspects, the first opening may be orthogonal to the second opening.

In some aspects, the base of the housing may further comprise a focusing lens slot. The focusing lens slot may be positioned such that when the motorized gimbaled mirror is mounted to the motorized gimbaled mirror mount, a center of the mirror of the motorized gimbaled mirror may be aligned with a center of the focusing lens slot. In some aspects, a distance from the center of the focusing lens slot to the center of the mirror of the motorized gimbaled mirror may be the focal length of a focusing lens.

In some aspects, the housing may further comprise a spacer mountable adjacent to the focusing lens slot where a distance from the center of the focusing lens slot to a distal end of the spacer when the spacer is mounted may be the focal length of the focusing lens. The spacer may comprise a first opening and a second opening dimensioned to receive light reflected from a target and light emitted toward the target. In some aspect, the spacer may have an annular recess dimensioned for receiving an imaging window. The annular recess may be on the distal end of the spacer.

In some aspects, the base of the housing may further comprise a mount for a beam splitter. The mount may be angled with respect to the longitudinal axis of the first recess and the second recess. The angle may be 45°.

In some aspects, the housing may have venting. The motor cover and/or the wall may have the venting.

BRIEF DESCRIPTION OF THE FIGURES

The patent or application file contains at least one drawing executed in color. Copies of this paper or patent application publication with color drawing(s) will be provided by the Office upon request and payment of the necessary fee.

FIG. 7A illustrates raster scan corrected for intercoupling of the axes but not corrected for a lens and the resultant beam located at the target based on simulation;

FIG. 7B illustrates raster scan corrected for intercoupling of the axes and corrected for a lens and the resultant beam located at the target based on simulation;

FIG. 8 illustrates rotational axis alignment with respect to an incident beam and reflected beam from the gimbaled mirror in accordance with other aspects of the disclosure;

FIG. 9 illustrates a lens plane and rotation vis-à-vis the plane;

FIGS. 10A and 10B illustrates relationships of the angular rotations of the gimbaled mirror and the x and y position of the target for the orientation depicted in FIG. 4a;

FIG. 12 illustrates the gimbaled mirror with the mirror frame as orientated in FIG. 8;

FIG. 19A illustrates the peak-to peak amplitude as a function of the angle for the four focusing lenses;

FIG. 19B illustrates the focus position as a function of angle for the four focusing lenses;

FIG. 21A illustrates a photograph of the target;

FIGS. 21B1-B4 illustrate peak-to-peak amplitude images of four regions of the target;

FIGS. 21C1-21C4 illustrate time-traces for respective sections depicted in FIGS. 21B1-B4;

FIGS. 21D1-21D4 illustrate time-traces for respective sections depicted in FIGS. 21B1-B4;

DETAILED DESCRIPTION

Aspects of the disclosure provide scanning devices and scanning systems which can acquire three-dimensional spectroscopic images in a terahertz range.

Figure 1:
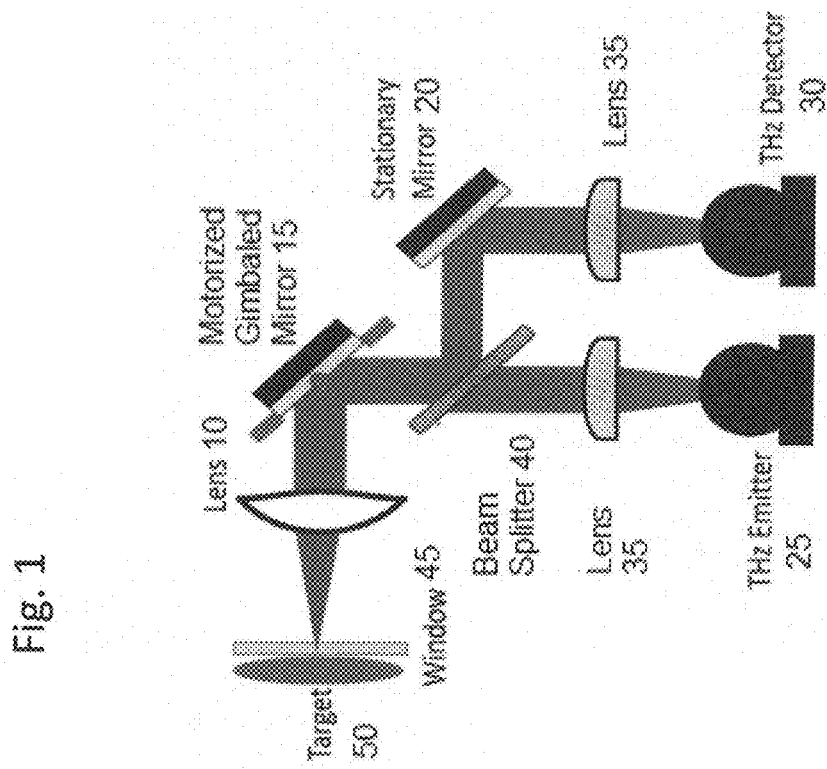
FIG. 1 illustrates optical components of a handheld terahertz scanner and a representative target in accordance with aspects of the disclosure.

In some aspects of the disclosure, the scanning device is portable such as a handheld terahertz scanner (also referred to as handheld scanning device). FIG. 1 shows an example of a handheld scanning device for scanning a target 50 in accordance with aspects of the disclosure. In some aspects of the disclosure, the handheld scanning device may comprise a focusing lens 10 (also references herein as the scanning lens), a motorized gimbaled mirror 15, a beam splitter 40, a stationary mirror 20, a terahertz emitter 25, a terahertz detector 30 and lenses 35.

As depicted, the focusing lens 10 is an f-theta lens (also referred to as f-Θ lens). An f-theta lens is telecentric. The f-theta lens has advantages over other types of lens. For example, the focal plane of an ideal f-theta lens is planar rather than a curved surface. This allows for achieving a target plane, which is particularly suited to scan a flat surface of a target 50. Further, in a telecentric lens, the focused beam is perpendicular to the target plane over its full range, thus the reflected signal (from the target) returns by the same path as the incident beam, removing a need for a second set of optics for descanning. Additionally, the time of flight for all scanning angles (of the motorized gimbaled Mirror 15) is substantially the same which allows for more accurate measurement of a depth of features in the target. Additionally, the lens may have the property that the focused beam has a substantially constant spot-size.

While the focusing lens 10 depicted in FIG. 1 is an f-theta lens, other lenses or a combination of lenses may be used depending on the application and requirements. For example, a biconvex lens or a plano convex lens may be used.

In an aspect of the disclosure, the focusing lens 10 is rotational symmetric.

In an aspect of the disclosure, the f-theta lens may be formed of high-density polyethylene ("HDPE"). However, the material used for the f-theta lens is not limited to HDPE and other materials may be used. For example, in some aspects of the disclosure, the f-theta lens may be made from poly 4 methyl pentene-1 ("TPX") or Polytetrafluoroethylene ("PTFE").

In some aspects, the f-theta lens may be designed to have a spectral performance between 0.3 and 1 THz with a center frequency of 0.5 THz. In other aspects, the range may be larger. For example, the f-theta lens may be designed to have a spectral performance between 0.05 and 1.6 THz. In other aspects, the f-theta lens may be designed to have a spectral performance between 0.05 and 3 THz. The shape of the lens may be customized to achieve a target frequency range. In other aspects, the material for the lens may be selected to achieve the target range. The shape of the lens may be different depending on the material used. For example, a PTFE lens may be thicker than an HDPE lens for a target frequency range.

Depending on the specific application for the handheld terahertz scanner, e.g., type of target and thickness and desired analysis, the lens 10 may be designed for a large depth of focus. In some aspects, the lens 10 may have a depth of focus of at least 2 mm. For example, in medical applications, the depth of focus may be less than in other applications such as imaging an airplane wing or other metallic structures. In other aspects, the depth of focus may be larger, such as 11.1 mm. By choosing a lens with a large depth of focus and recording phase or time resolved measurements, accurate imaging in three dimensions is possible.

The focal length of the focusing lens 10 may be set based on a desired size of the handheld terahertz scanner. For example, given a desire for a small device, the focal length of the lens 10 may be about 40 mm. In other aspects of the disclosure, other focal lengths may be used, such as about 50 mm.

The spot size may be based on the application and size of the target. In some aspects, the lens 10 may also be designed for a small spot size. For example, the lens 10 may have a focusing optic spot size of about 2.5 mm over its range. The spot size may depend on the frequency range, collimated beam size and focal length of the lens 10. For example, decreasing the focal length may decrease the spot size. Also, changing the frequency range to increase the average frequency may decrease the spot size. Further, increasing the collimated beam size may decrease the spot size.

In other aspects, certain parameters of the lens 10 may be set to minimize a residue. The residue is given by the following equation:

$$res = w_t t + \frac{1}{N_\alpha} \Sigma_\alpha w_s s + w_i i^2 \quad (1)$$

where the summation is over the discrete angles of the scanning mirror $\alpha$; the spot-size s is determined as the standard deviation of the positions of the rays on the target plane; and the incidence angle i is measured from the normal of the incidence plane in degrees. The thickness of the lens t is measured on the optical axis in mm. Setting the weight parameters to $w_s = w_i = 50 \cdot w_t$, a satisfying f-θ lens may be obtained.

A value of $w_t$ is based on a trade-off between lens thickness and geometrical focusing error.

Figure 3:
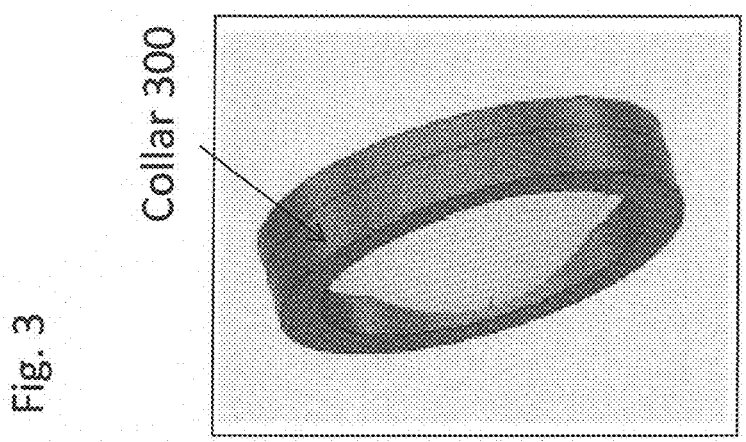
FIG. 3 illustrates a lens for the handheld terahertz scanner in accordance with aspects of the disclosure.

FIG. 3 depicts an example of the focusing lens 10 in accordance with aspects of the disclosure. The lens 10 includes a collar 300 around the edge of the lens for mounting to a housing, as will be described later.

The motorized gimbaled mirror 15 is used for 2-Dimensional raster scanning of the target 50. The motorized gimbaled mirror 15 comprises a single mirror and a frame. The mirror is mounted to the frame. The frame and/or mirror are capable of being rotated in two axes. For example, the frame and/or mirror may be rotated in an elevation axis 400 and an azimuthal axis 405 to steer a beam to a target. The motorized gimbaled mirror 15 has two motors, one for each axis.

The mirror is positioned at one of the focal planes of the lens 10 (center of the mirror); thus the axes of rotation are both centered on the lens focus to eliminate the distortions caused by the two-mirror steering. Steering the focused beam across the sample surface retains the benefits of a single point raster, without the need for translational stages capable of moving large equipment or samples.

Figure 4A:
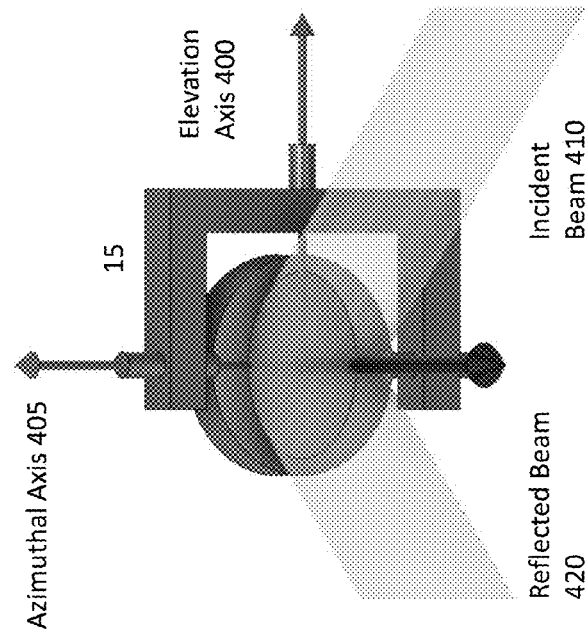
FIG. 4A illustrates rotational axis alignment with respect to an incident beam and reflected beam from a gimbaled mirror in accordance with aspects of the disclosure.
Figure 4B:
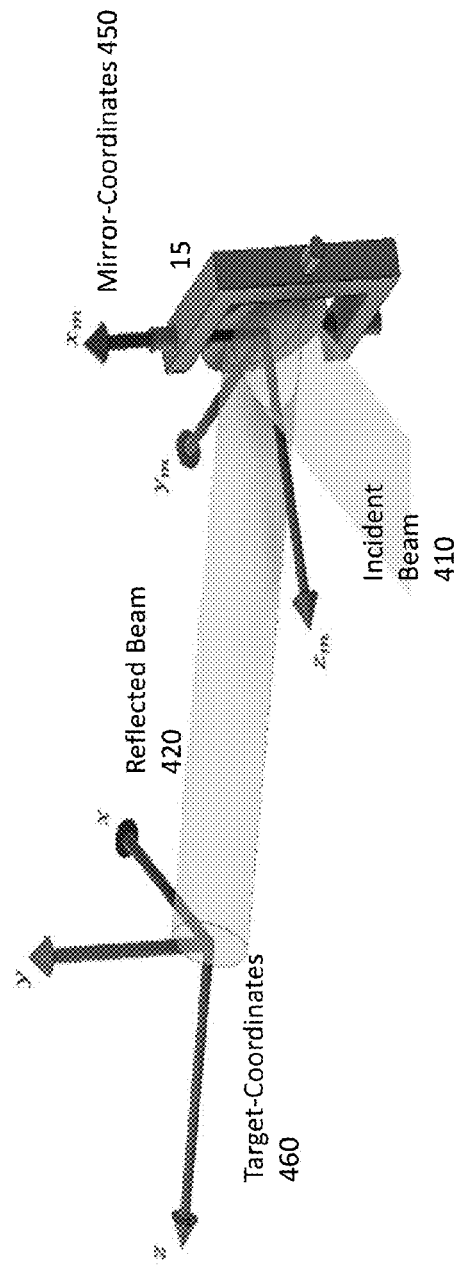
FIG. 4B illustrates mirror coordinates and target coordinates in accordance with aspects of the disclosure.

FIG. 4A and FIG. 4B illustrate one example alignment of the rotational axes with respect to the incident beam 410 (in FIGS. 4A and 4B, the incident beam is the beam emitted from the emitter 25). In FIGS. 4A and 4B, the elevation axis 400 (of rotation) is not aligned with the incident beam 410. The elevation axis 400 is parallel to the face of the mirror. In this orientation, the rotational axes are intercoupled. Due to this intercoupling, any change in the elevation direction of the beam will rotate the azimuthal axis to a different orientation with respect to the incident beam. In other words, the horizontal and vertical directions of scan do not directly correspond to independent axes of the gimbaled motion.

Figure 5:
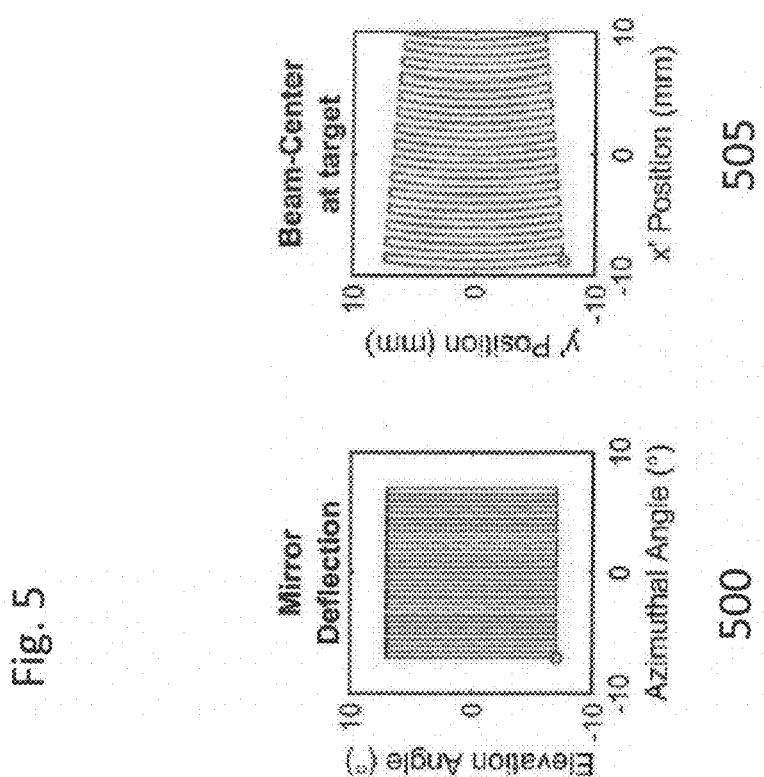
FIG. 5 illustrates coupled nature of the axes of rotation.

FIG. 5 shows a raster scan through a rectilinear grid of angles in the two gimbaled axes (chart 500) as well as the resultant wedge-shaped scanning pattern on the target (chart 505), depicted by a ray-tracing simulation. This wedge-shape is characteristic of an intercoupled gimbaled mirror axes. The circular marks in 500 and 505 represent a start of a scan. The dashed lines represent a rotational maximum for the gimbaled mirror 15.

Therefore, in accordance with aspects of the disclosure, the beam steering is corrected, e.g., motor rotation angles which correspond to a desired scanning location are adjusted.

FIG. 4B depicts mirror-coordinates 450 and target-coordinates 460.

The origin is defined as the center of the face of the mirror, the z-axis is defined by the mirror-normal at zero deflection, and the x- and y-axes correspond, respectively, to the azimuthal and elevation axes of rotation at that position.

Using this definition, the incident beam 410 from the emitter 25 has the direction:

$$\hat{b}_{m,in} = \frac{1}{\sqrt{2}} \begin{pmatrix} 0 \\ 1 \\ -1 \end{pmatrix}_m \quad (2)$$

With the choice of coordinates, the azimuth and elevation angles, $\alpha$ and $\beta$, of the motorized axes correspond to spherical coordinate angles of the mirror normal, $\hat{m}$:

$$\hat{m} = \begin{pmatrix} \cos(\alpha)\sin(\beta) \\ \sin(\alpha) \\ \cos(\alpha)\cos(\beta) \end{pmatrix}_m \quad (3)$$

Figure 6:
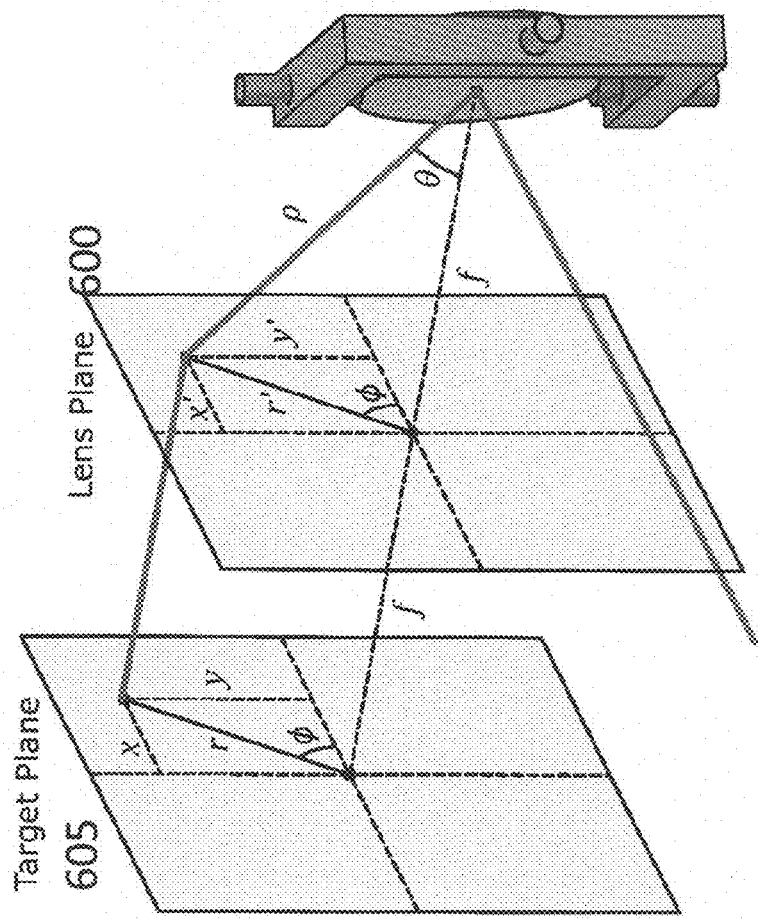
FIG. 6 illustrates different planes including a lens plane and a target plane in accordance with aspects of the disclosure.

FIG. 6 shows definitions of a lens plane 600 and target plane 605 and coordinates. The blue path corresponds to an example chief ray propagating through the system.

As shown in FIG. 6, the coordinate system, corresponding to the scanning location, is defined such that the origin is at the point where the lens's optic axis crosses the back focal plane of the lens 10, z is into the target 50, and the x and y directions are as shown in target plane 605. The mirror-coordinate vector of an outgoing beam (reflected beam 420 from the mirror), $b_{m,out}$, given the location in target coordinates, $b_{out}$, is given by $$Ab_{out} = \begin{bmatrix} 0 & 1 & 0 \\ \frac{1}{\sqrt{2}} & 0 & \frac{1}{\sqrt{2}} \\ -\frac{1}{\sqrt{2}} & 0 & \frac{1}{\sqrt{2}} \end{bmatrix} \begin{pmatrix} x \\ y \\ f \end{pmatrix} = \begin{pmatrix} x_m \\ y_m \\ z_m \end{pmatrix} = b_{m,out}, \quad (4)$$

where f is the focal length of the lens 10 and represents the distance from the mirror to the lens 10 and A represents the matrix. As the lens 10 is telecentric, the beam will be projected to this point for any z-coordinate after the lens. In order to direct the beam to a specific location, the incident and reflected vectors of the beam at the mirror must be bisected by $\hat{m}$. The direction of this can be found using the equation $$m = \left\| -\hat{b}_{m,in} \right\| b_{m,out} + \left\| b_{m,out} \right\| (-\hat{b}_{m,in}) = \begin{pmatrix} m_x \\ m_y \\ m_z \end{pmatrix}_m. \quad (5)$$

The two angles can then be found by using the spherical coordinates from Eq. (3):

$$\alpha = \arcsin\left(\frac{m_y}{\|m\|}\right), \quad (6)$$

$$\beta = \arctan\left(\frac{m_x}{m_z}\right) \quad (7)$$

However, even when the angles of rotation are adjusted for the intercoupling of the axes, there may be a spot in the center of the lens because an actual f-theta lens or any lens is not ideal. FIG. 7A shows the raster scan 700 of the gimbaled mirror 15 as described above, e.g., angular rotation for the elevation and azimuthal axes (chart 700) and the resultant beam located at the target (chart 705) based on simulation using a model of a lens thickness. The circular dashed line in FIG. 7A in chart 705 shows a deviation. Once again, the dots represent the start of the scan and dashed lines represent the maximum rotation.

To compensate for the actual behavior of the f-theta lens, a small correction may be needed to address the pinching of the beam location the middle of the scan range as seen in chart 705 in FIG. 7A. Ideally, the distance from the beam axis at the target for an f-theta lens would be given by: r=f×θ (other lenses would have a different relationship). For an f-theta lens, a better approximation is r=s×θ+a, where s and α were determined through ray-tracing simulation. In this case, the coordinates for aiming the beam are modified and $b_{out}$ is replaced with $b_{out}^1$ in Equation (3) such that $$\begin{pmatrix} x \\ y \end{pmatrix} \frac{f}{r} \tan\left(\frac{r-a}{s}\right) = \begin{pmatrix} x' \\ y' \end{pmatrix} \quad (8)$$

$$\begin{pmatrix} x' \\ y' \\ f \end{pmatrix} = b'_{out}, \quad (9)$$

$$A b'_{out} = b_{m,out}. \quad (10)$$

FIG. 7B shows a corrected mirror deflection, e.g., rotation of the axes (chart 750) and the resultant beam located at the target (chart 755) based on simulation.

FIG. 8 illustrates another rotational axes alignment with respect to the incident beam 410 (from the emitter 25). In FIG. 8, the elevation axis 400A is aligned (parallel) with the incident beam 410. The elevation axis 400A may also parallel to the target 50. In this orientation, the two axes are substantially uncoupled. Uncoupled means that a relative orientation of an axis with respect to the incident beam is not changed by the rotation of the other axis.

As shown, the mirror is biased by about 45° about the azimuthal axis 405A. In this orientation, the elevation axis does not pass orthogonal or parallel through the face of the mirror.

In this orientation, correction for intercoupling may not be needed as the axes are substantially uncoupled.

FIG. 9 shows incident beam ($b_{in}$) and reflected beam ($b_{out}$) (from the mirror) and rotational angles α, β. At the lens plane 900, (before lens correction), the y-coordinate only dependent on f, and β, where h is the distance to the lens plane 900 at elevation angle β.

Thus, the incident beam is represented as:

$$\hat{b}_{in} = \begin{pmatrix} 1 \\ 0 \\ 0 \end{pmatrix}, \quad (11)$$

The reflected beam is represented as:

$$b_{out} = \begin{pmatrix} x \\ y \\ f \end{pmatrix}, \quad (12)$$

The direction can be represented as:

$$m = \|\hat{b}_{in}\| b_{out} + \|b_{out}\|(-\hat{b}_{in}) = \begin{pmatrix} m_x \\ m_y \\ m_z \end{pmatrix} \quad (13)$$

Since the orientation is offset:

$$\alpha = \arctan\left(\frac{m_x}{\sqrt{m_y^2 + m_z^2}}\right) + 45°, \quad (14)$$

$$\beta = \arctan\left(\frac{m_y}{m_z}\right) \quad (15)$$

However, to correct for the lens 10, the reflected beam may be represented by:

$$b'_{out} = \begin{pmatrix} x' \\ y' \\ f \end{pmatrix} \quad (16)$$

where in place of $b_{out}$ the same values as described above may be used in the r=s×θ+a correction.

Since the angle is offset, $\alpha_m = \alpha + 45°$ and therefore:

$$\hat{m} = \begin{pmatrix} -\cos(\alpha_m) \\ \sin(\alpha_m)\sin(\beta) \\ \sin(\alpha_m)\cos(\beta) \end{pmatrix} \quad (17)$$

Thus reflecting $-b_{in}$ about $\hat{m}$ to find direction of $b_{out}$:

$$b_{out} \propto 2((-b_{in}) \cdot \hat{m})\hat{m} + b_{in} \quad (18)$$

and $$b_{out} = \begin{pmatrix} f\sec(\beta)\tan(2\alpha) \\ f\tan(\beta) \\ f \end{pmatrix} \propto \begin{pmatrix} \tan(2\alpha) \\ \sin(\beta) \\ \cos(\beta) \end{pmatrix} \quad (19)$$

Figure 10B:
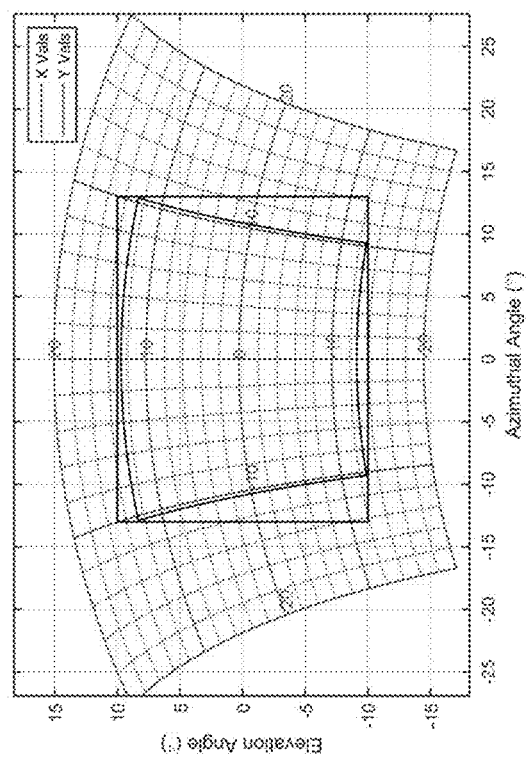
Figure 10A:
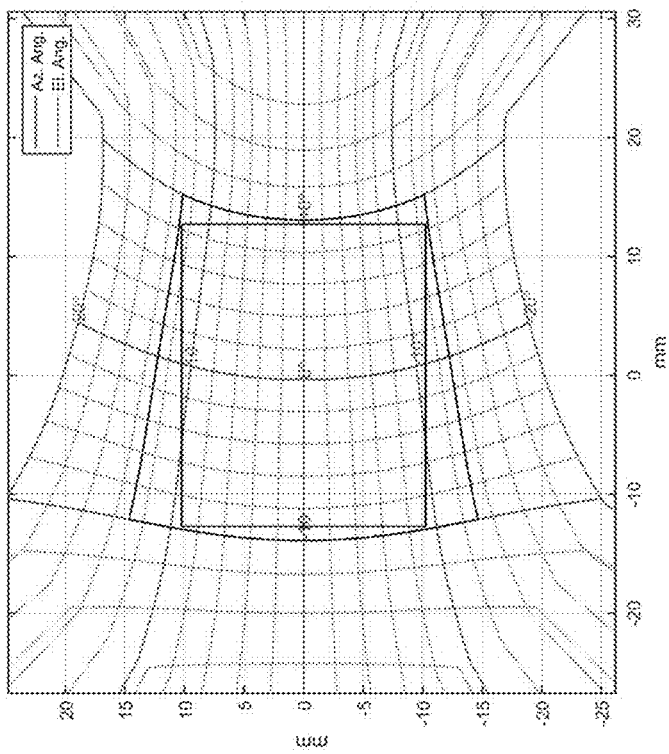

FIGS. 10A and 10B show relationships of the angular rotations of the gimbaled mirror 15 and the x and y positions of the target for the orientation depicted in FIG. 4A. The graph 1000 in FIG. 10A depicts the elevation angle and azimuthal angle of rotations as a function of the x and y positions and the graph 1005 in FIG. 10B depicts the reverse (x and y positions as a function of elevation angle and azimuthal angle. In FIG. 10A, the blue lines are the azimuthal angles and the red lines are the elevation angles. In FIG. 10B, the blue lines are the x positions whereas the red lines are the y positions. In FIG. 10A, the outer curved shape represents a range if the motors were able to achieve 10° of rotation and the inner rectangle is the largest rectangle that fits within the range. As shown by the non-linearity, the rotation of one axis affects the rotation of the other axis.

Figure 11B:
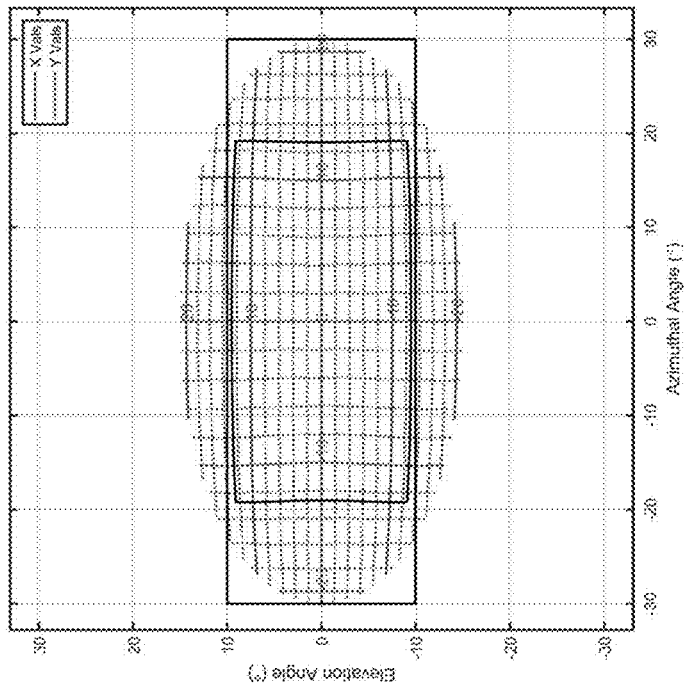
FIGS. 11A and 11B illustrates relationships of the angular rotations of the gimbaled mirror and the x and y position of the target for the orientation depicted in FIG. 8.
Figure 11A:
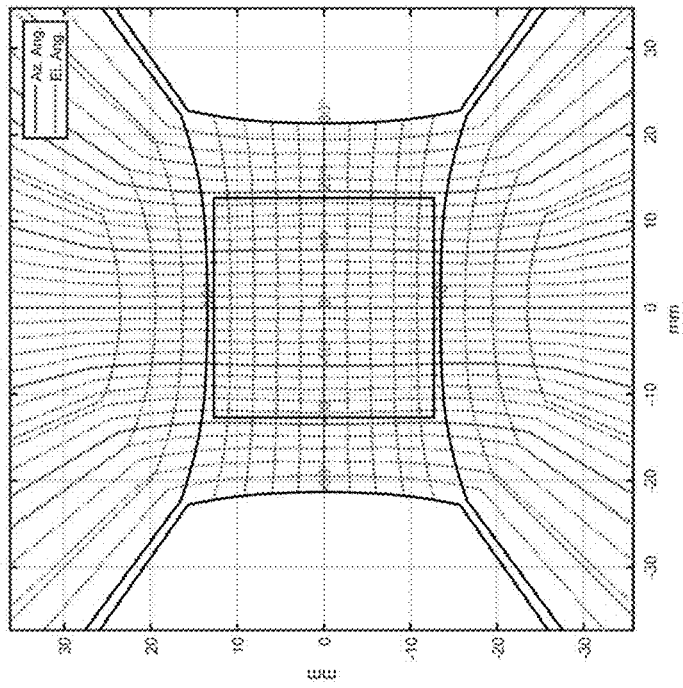

In contrast, FIGS. 11A and 11B show relationships of the angular rotations of the gimbaled mirror 15 and the x and y positions of the target for the orientation depicted in FIG. 8. The graph 1100 in FIG. 11A depicts the elevation angle and azimuthal angle of rotations as a function of the x and y positions and the graph 1105 in FIG. 11B depicts the reverse (x and y positions as a function of elevation angle and azimuthal angle. In FIG. 11A, the square represents a 1 in imaging region. The outer dark lines represent the lens 10 range. As illustrated, the red and blue lines are substantially linear within the lens range reflecting the substantial independence of the axes.

In contrast, FIGS. 11a and 11b show relationships of the angular rotations of the gimbaled mirror 15 and the x and y positions of the target for the orientation depicted in FIG. 8. The graph 1100 in FIG. 11a depicts the elevation angle and azimuthal angle of rotations as a function of the x and y positions and the graph 1105 in FIG. 11b depicts the reverse (x and y positions as a function of elevation angle and azimuthal angle. In FIG. 11a, the square represents a 1 in imaging region. The outer dark lines represent the lens 10 range. As illustrated, the red and blue lines are substantially linear within the lens range reflecting the substantial independence of the axes.

FIG. 12 illustrates the motorized gimbaled mirror 15. The motorized gimbaled mirror 15 comprises a single mirror 1200, a frame 1215, and two motors 1205, 1210. The two motors 1205, 1210 are stacked. The frame 1215 is mounted on the motors 1205, 1210. The frame 1215 rotates in the elevation and azimuthal axes along with the mirror 1200. As depicted in FIG. 12, the mirror is oriented in the manner shown in FIG. 8. The motors are controlled via an external motor controller and system controller. Examples of motorized gimbaled mirror 15 and motor controller are available from Zaber Technologies Inc. The frame is designed to produce the offset in alignment of the mirror with respect to the axes of rotation and placement of the mirror at a focal point of the lens 10 (when mounted in a housing).

Figure 13:
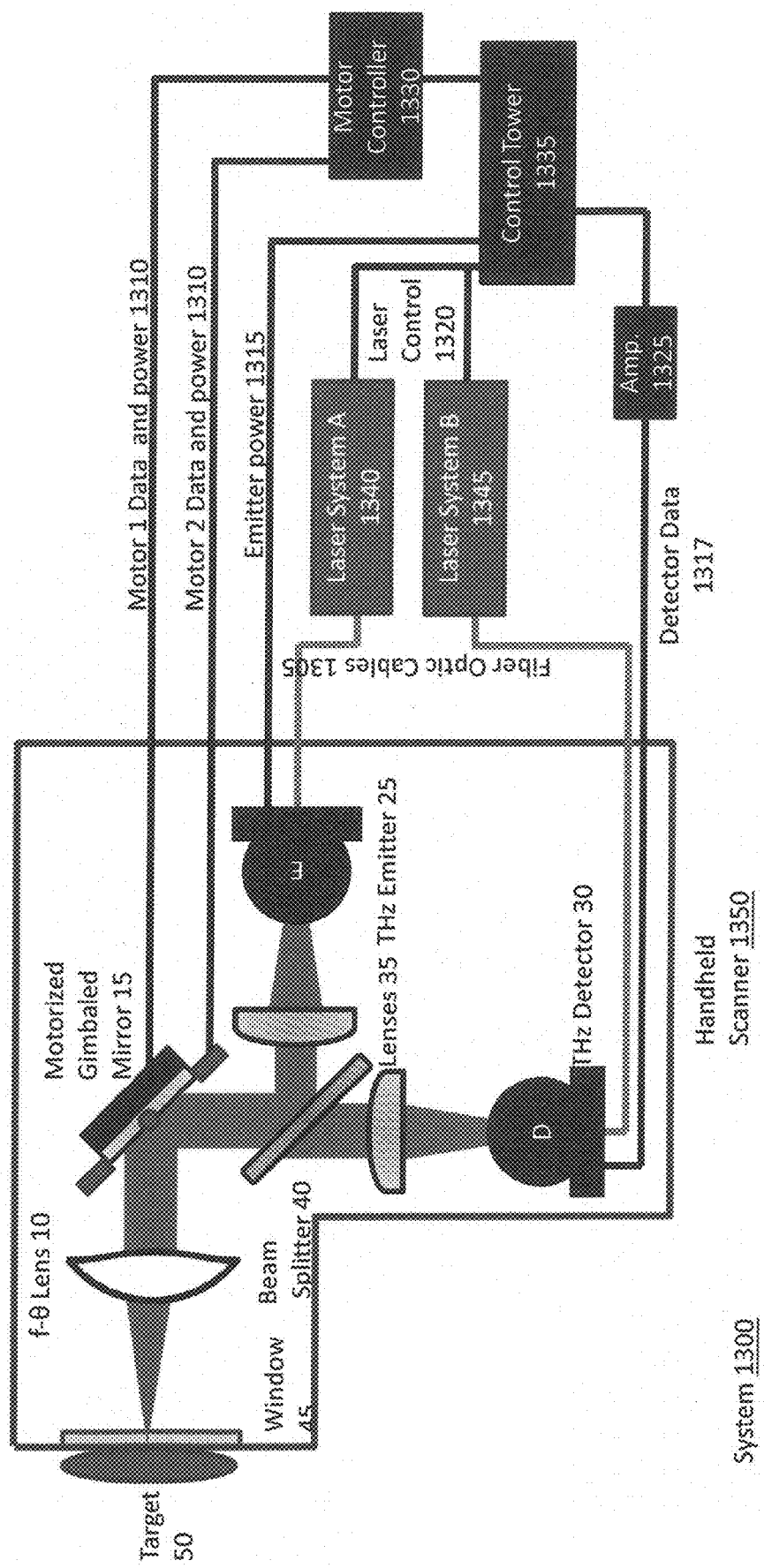
FIG. 13 illustrates an example of an imaging system having a handheld terahertz scanner in accordance with aspects of the disclosure.

In an aspect of the disclosure, the THz emitter 25 and THz detector 30 may be photoconductive antennas (PCA) such as available from Menlo Systems, Inc. The THz emitter and detector 25, 30, respectively, are coupled via a fiber optic cable(s) to an external laser source. In an aspect of the disclosure, the external laser source may be two separate lasers. The PCAs may be part of an asynchronous optical sampling system such as available from Menlo Systems Inc. FIG. 13 depicts an example of an imaging system in accordance with aspects of the disclosure. FIG. 13 will be described later in detail.

The THz emitter and detector 25, 30 are not limited to PCAs. For example, other light sources and detectors may be used such as diodes, and a terahertz photomixer.

The lens 35 may be disposed adjacent to the THz emitter 25 and THz detector 30, respectively. Each lens 35 may be a plano convex lens or a biconvex lens. By way of example only, the lens may be a TPX50 lens. This lens is configured to collimate and focus the beam emitted from the THz emitter 25 and the beam reflected by the target 50 toward the THz detector 30. When a PCA is used as the THz emitter 25/THz detector 30, the PCA may include an integrated lens. This integrated lens works in combination with the lens 35 to collimate the beam. Additionally, depending on the type of THz emitter 25 and THz detector 30, the lens 35 may be omitted. For example, when the THz emitter 25 emits a collimated terahertz beam, the lens 35 may be omitted.

In an aspect of the disclosure, a beam splitter 40 may be positioned between the THz emitter 25 and the motorized gimbaled mirror 15. The beam splitter 40 divides the emitted light into different paths. For example, a portion of the emitted beam from the THz emitter 25 will proceed to the motorized gimbaled mirror 15 and ultimately to the target 50. Light reflected by the target 50 and incident on the gimbaled mirror 45 travels to the beam splitter 40 and the beam splitter 40 directs the reflected light toward the THz detector 30. As depicted, the beam splitter 40 is angled to about 45°. In an aspect of the disclosure, the beam splitter 40 may be a 50% transparency beam splitter. The beam splitter may be made from a high-resistivity silicon (Si-BS).

In an aspect of the disclosure, the beam splitter 40 may be omitted where the THz emitter 25 and the THz detector 30 are co-located and/or on the same IC.

Figure 2:
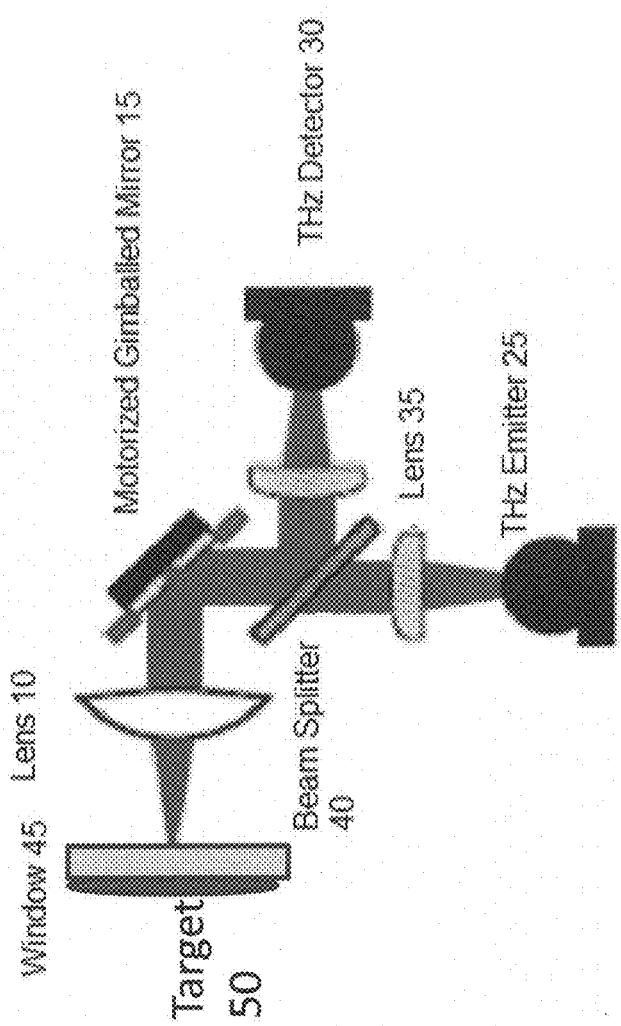
FIG. 2 illustrates optical components of another handheld terahertz scanner and a representative target in accordance with aspects of the disclosure.

The THz detector 30 may be located in different positions within the handheld terahertz scanner. As depicted in FIG. 1, the THz detector 30 is aligned with the THz emitter 25. Therefore, the handheld terahertz scanner also comprises the stationary mirror 20 to change the direction of the reflected beam from the target 50. However, in other aspects of the disclosure, the THz detector 30 may be perpendicular to the THz emitter 25, such as shown in FIG. 2 and the stationary mirror 20 may be omitted.

In an aspect of the disclosure, an imaging window 45 may be placed at the focus of the device in order to maintain a flat target surface. This window 45 can also be used for calibration, background removal, and improved material parameter estimation. The window 45 may be used when the target 50 is malleable or a liquid.

FIG. 13 is a diagram of an example imaging system 1300 in accordance with some aspects of the disclosure. The system 1300 shown in FIG. 13 is only by way of example of an imaging system having a handheld terahertz scanner 1350 described herein. A handheld terahertz scanner as described herein may be used in other types of imaging systems and the imaging system is not limited to the system depicted in FIG. 13. The example imaging system 1300 comprises a handheld terahertz scanner 1350 as described above. The example imaging system 1300 shown in FIG. 13 is an example set up when PCAs are used for the THz emitter 25 and THz detector 30. The set up shown in FIG.

13 is for the asynchronous optical sampling system (ASOPS). A similar set up may be used for electronically controlled optical sampling (ECOPS). As depicted, a laser system 1340, 1345 is respectively coupled to the THz emitter 25 and THz detector 30. For example, laser system A 1340 is coupled to the THz emitter 25 via a fiber optic cable 1305 and laser system B 1340 is coupled to the THz detector 30 via a fiber optic cable 1305. Each laser system 1340, 1345 comprises a femtosecond laser source. The laser may emit a wavelength of 1550 nm or 1560 nm. However, other wavelengths may be used such as 1300 and 1600 nm. The lasers are controlled via control electronics in a control tower 1335. The control tower 1335 is connected to the laser systems 1340, 1345 via one or more cables 1320 (identified as laser control 1320 in FIG. 13). The control tower 1335 may comprise laser control electronics, synchronization electronics, THz electronics, data acquisition platform and a processor (such as a CPU) for measurement and data analysis. These components are collectively referred to herein as a system controller. A display for displaying the images may be connected to the control tower 1335 (display is not shown in FIG. 13). The same display may be used for inputting acquisition parameters. This display may include a touch screen or panel.

The control tower 1335 is coupled to the THz emitter 25 via one or more cables to supply power (Emitter Power 1315 in FIG. 13). This power biases the emitter 25. The control tower 1335 is also coupled to the THz detector 30 via one or more cables to receive the detection result (data)(Detector Data 1317 in FIG. 13). The detection data 1317 may be amplified by an amplifier 1325 prior to receipt by the control tower 1335. Power for the amplifier 1325 may be supplied by the control power 1335.

When an ASOPS is used, the laser systems 1340, 1345 operate at a locked repetition rate. The laser systems 1340, 1345 have a tunable difference. The synchronization electronics monitor and assure that the lasers maintain the locked repetition rate and tunable difference. The control tower 1335 may also comprise power supplies for the laser systems. In other systems, the controls may be different.

The example imaging system 1300 also comprises a motor controller 1330. The motor controller 1330 is connected to the control tower 1335. In an aspect of the disclosure, the motor controller 1330 may be connected to control power 1335 via a USB connection. The motor controller 1330 controls the motors (such as 1205 and 1210) for the motorized gimbaled mirror 15 using a programmed beam steering (an example of an acquisition parameter) for the scan in conjunction with the control tower 1335 (which outputs the respective control signals). The motor controller 1330 may include the power supply for the motors. The motor controller 1330 receives a digital output from the control tower 1335 and supplies the data signal and power to the two motors (such as 1205 and 1210). The motor controller 1330 may separately drive the two different axes (motors) via the connections. The connections are shown in FIG. 13 as Motor 1 data and power 1310 and Motor 2 data and power 1310. The data refers to the specific rotation for the respective motor. In some aspects, the motors for the gimbaled mirror 15 may be stepper motors.

In an aspect of the disclosure, the control tower 1335 may provide separate isolated signals to the motor controller 1330 for the different axes. As such, the motor controller 1330 may be connected to the control tower via two separate cables.

In accordance with aspects of the disclosure, the example imaging system 1300 may receive acquisition parameters input into the control tower 1335. The acquisition parameters may include a resolution (pixel size). For example, the system 1300 is capable of different resolutions. For example, the system 1300 may have at least a first resolution and a second resolution. The pixel size for the first resolution may be 1 mm. The pixel size for the second resolution may be 0.25 mm. The resolution impacts the step size for the beam steering, e.g., difference in angles of rotations for the mirror between adjacent points of acquisition. Other acquisition parameters may include the number of time domain traces averaged per pixel, such as 10, 100, 1000 or more, and the frequency resolution and time resolution of each measurement per each pixel.

The resolution and number of data points obtained at each pixel may be target or application specific and also may be based on a desired processing of the image data, such as whether an en-face image is desired or whether a 3-D image is desired.

Additionally, once the data is acquired, the processing of the data may be based on the target and application such as whether an en-face image is desired or whether a 3-D image is desired or whether the material in the target is resonant or not. Different processing methods and techniques are known and will not be described herein in detail.

The handheld terahertz scanner described herein may be used in other setups. For example, instead of using two separate lasers as described above, the imaging system may have a single laser and incorporate a mechanical delay stage to obtain different points.

In other aspects, when PCAs are not used as the THz emitter 25 and THz detector 30, and other types are emitters are used, such as a diode, the lasers may be omitted.

Simulations

Figures 14A, 14B, 14C, 14D:
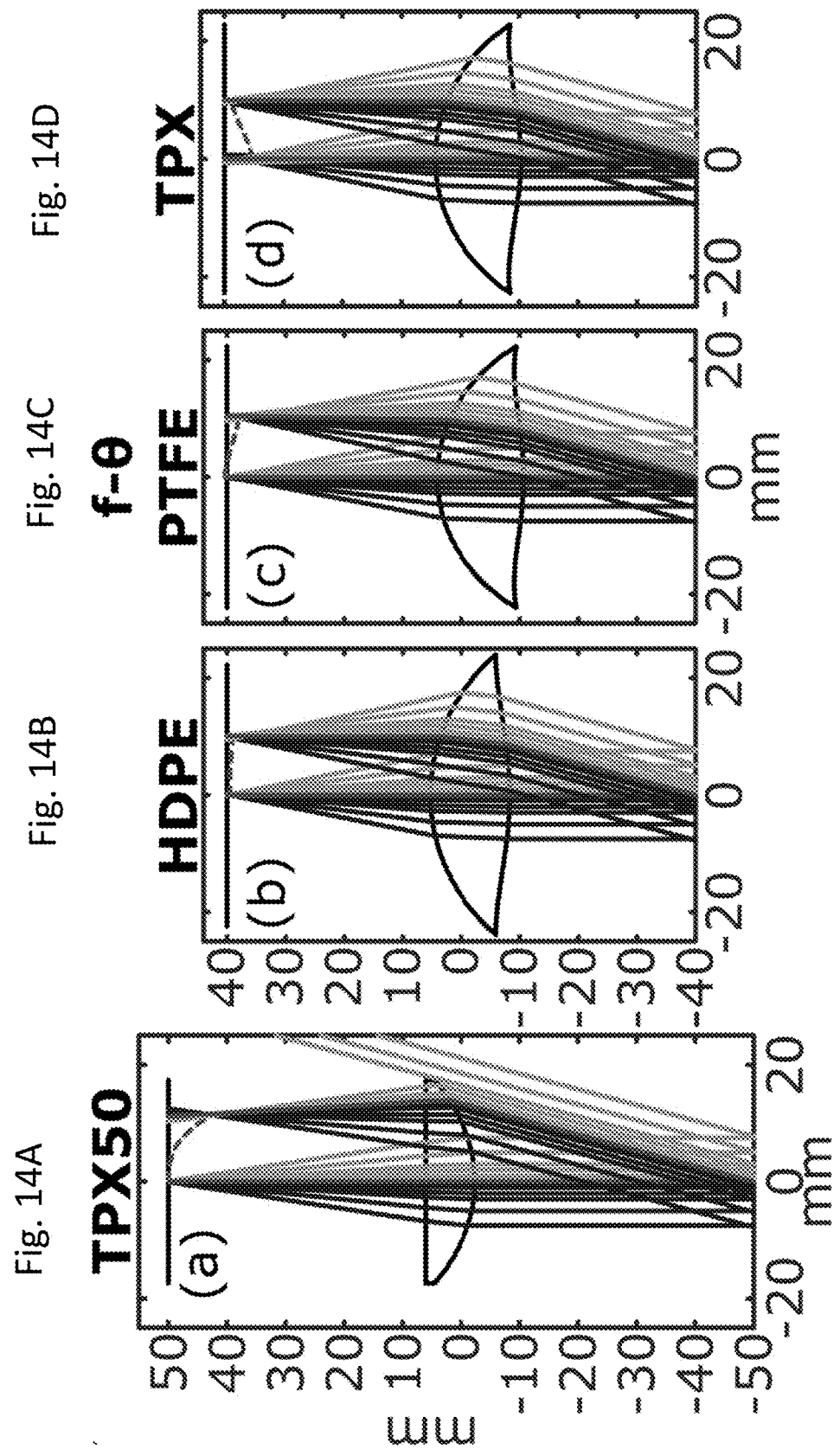
FIGS. 14A-14D illustrate stimulation results for four focusing lenses in accordance with aspects of the disclosure.

A simulation was done to compare the performance of four different focusing lenses. The first lens was a conventional plano-convex lens, TPX50 (aspheric, 50 mm focal length, 38.1 mm diameter). The other lenses were f-theta lenses of different materials. The lenses also had slightly different shapes. The f-θ lenses (radially symmetric, aspheric, 40 mm focal length, 50.8 mm diameter), were designed using the optical properties of TPX, PTFE, and HDPE (n=1.46, 1.43, and 1.54, respectively). Although these polymer materials have relatively similar refractive indices, their optical properties may vary depending on the manufacturer. FIGS. 14A-14D show ray tracing simulations of 15-mm diameter beams at θ=0 and 15° deflection angle to compare the performance of the four focusing lenses. FIG. 14A shows the ray tracing for the conventional plano-convex lens; FIG. 14B shows the ray tracing for the f-θ lens designed from HDPE; FIG. 14C shows the ray tracing for the f-θ lens designed from PTFE; and FIG. 14D shows the ray tracing for the f-θ lens designed from TPX. In FIGS. 14A-14D the red dashed lines represents the location of the focus at angles between 0° and 15°. Importantly, HDPE has a negative dispersion, whereas PTFE and TPX have 3- and 5-times larger positive dispersion (defined as Δn/Δf) respectively, which impact their broadband THz properties. As can be seen from FIGS. 14A-14D, the telecentric f-θ lenses have advantages. Firstly, they maintain a planar focal surface as the beam angle is steered in a telecentric configuration. Additionally, the focused beam is perpendicular to the target plane over the full deflection range. Therefore, the reflected signal returns by the same path as the incident beam, removing the need for a second set of optics for de-scanning. Finally, the time of flight for all deflection angles is approximately constant which allows for more accurate phase-dependent measurements and spectroscopy.

Testing

Figure 15:
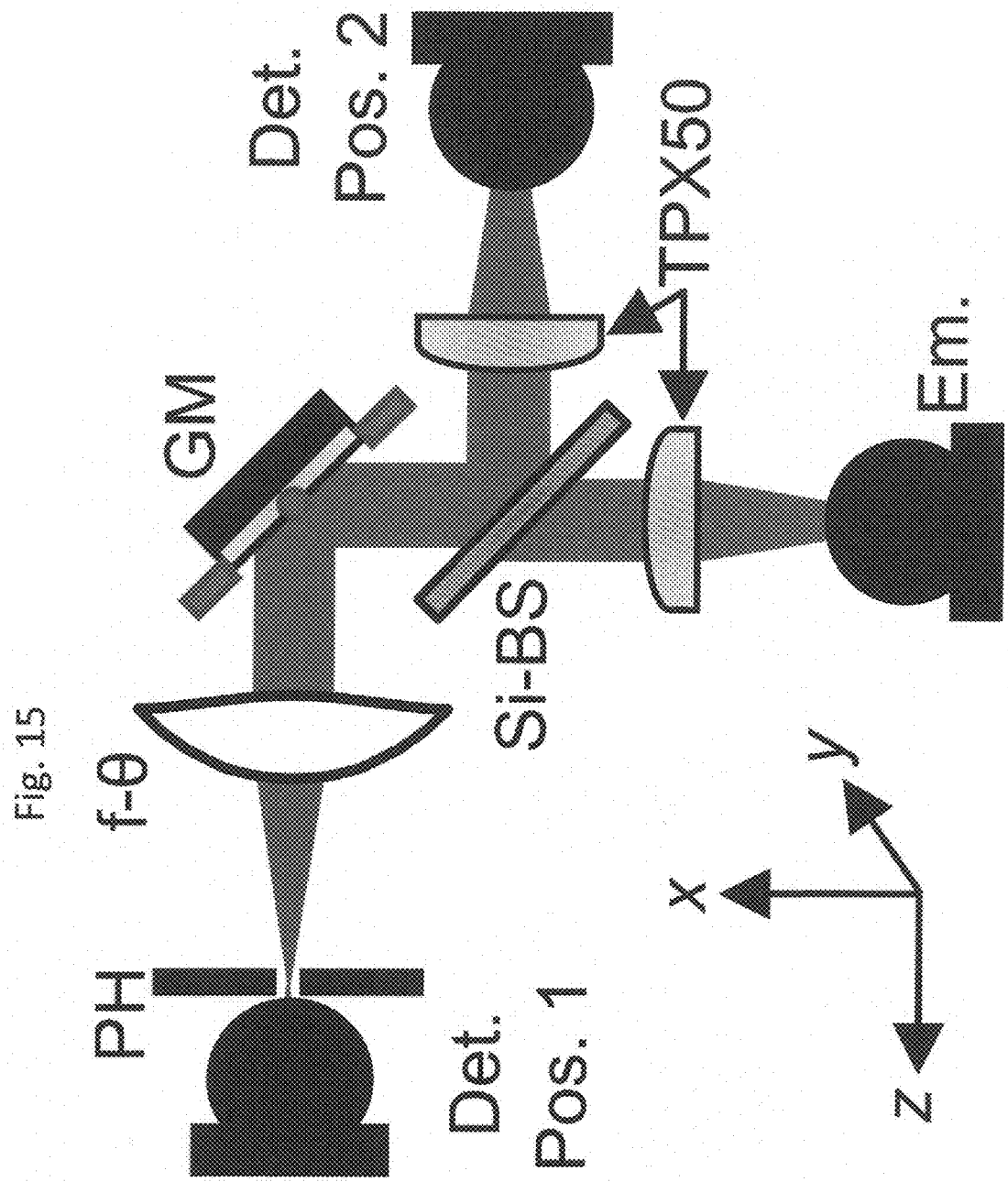
FIG. 15 illustrates a test set up in accordance with aspects of the disclosure.

The handheld terahertz scanner design was tested in a table top set up. FIG. 15 depicts the table top setup used for beam characterization to measure the performances of the lenses. The system controller, motor controller and lasers are not shown in FIG. 15. Det. Pos. 1 is the position of detector for transmission layout is used for spatial measurements (such as spot size), Det. Pos. 2 is the position of the detector for reflection layout and was used for alignment and time of arrival measurements. Em. refers to the terahertz emitter, Det. Refers to the terahertz detector. The gimbaled mirror is labeled GM and the beam splitter is labels Si-BS. A pin hole for access to the detector is labeled PH. The pin hole was used in the testing; however, it is not required for detection in normal operation. The collimating lenses are labeled TPX50. The focusing lens is labeled f-O although during the testing the different lenses were placed in this position. The THz emitter and detector were photoconductive antennas (PCA) and were obtained as part of the TERA ASOPS THz Time-Domain Spectrometer (Menlo Systems Inc. Newton, NJ, USA). The ASOPS has two lasers, one for the emitter and the other for the detector. The 1550 nm fiber-coupled PCA pigtails have integrated silicon lenses designed to be used with the TPX50 lenses for collimation and focusing.

The collimated beam was passed through a Si-BS before being steered towards the lenses by the GM (T-OMG, Zaber Technologies Inc. Vancouver, BC, Canada). The GM was used to raster scan a THz beam on the focal plane. The reflecting plane of the mirror and its axes of rotation coincided with the front focal point of the lens. By inserting a pinhole in front of the detector at position 1, unwanted rays were blocked. The use of the pinhole also reduced the effective cross-sectional area for a given measurement, allowing for sampling of smaller portions of the beam. The pinhole and detector were mounted together on a set of motorized 3D stages to allow the detector to move as needed.

The f-θ lenses were designed in using MATLAB and a two-dimensional ray tracing algorithm as described herein.

From using the ray tracing as shown in FIG. 14A, when the plano-convex TPX50 lens is used in a telecentric imaging scenario, placing it in reverse to its normal configuration shown in FIG. 14A, gives a better off-axis focusing performance. Therefore, the reverse orientation was used in the testing.

Lens alignment was accomplished by taking two perpendicular line scans in the reflection geometry on a flat mirror placed at the focus and perpendicular to the beam path. For horizontal and vertical alignment, the lens was placed at approximately its nominal axial location and adjustments were made until the difference in the time of arrival at various beam angles from the that of the chief ray was symmetrical about zero degrees in both axes. Fine tuning of the axial position of the lens was done by then comparing the shape of those traces to those produced by two-dimensional simulation and adjusting to find the best match.

Beam profiles were taken using the detector in Det Pos. 1 with the 1 mm diameter PH positioned at the nominal focal length of the lens. The detector and pinhole were then moved in a raster pattern with 0.5 mm steps perpendicularly to the beam-path in an 8 mm×8 mm area to produce a 2D cross-sectional image of the beam at that distance.

A time series was recorded at each pixel. The time series data was processed to determine the spot sizes for the f-θ lenses (at the different z positions).

Figures 16A, 16B, 16C, 16D:
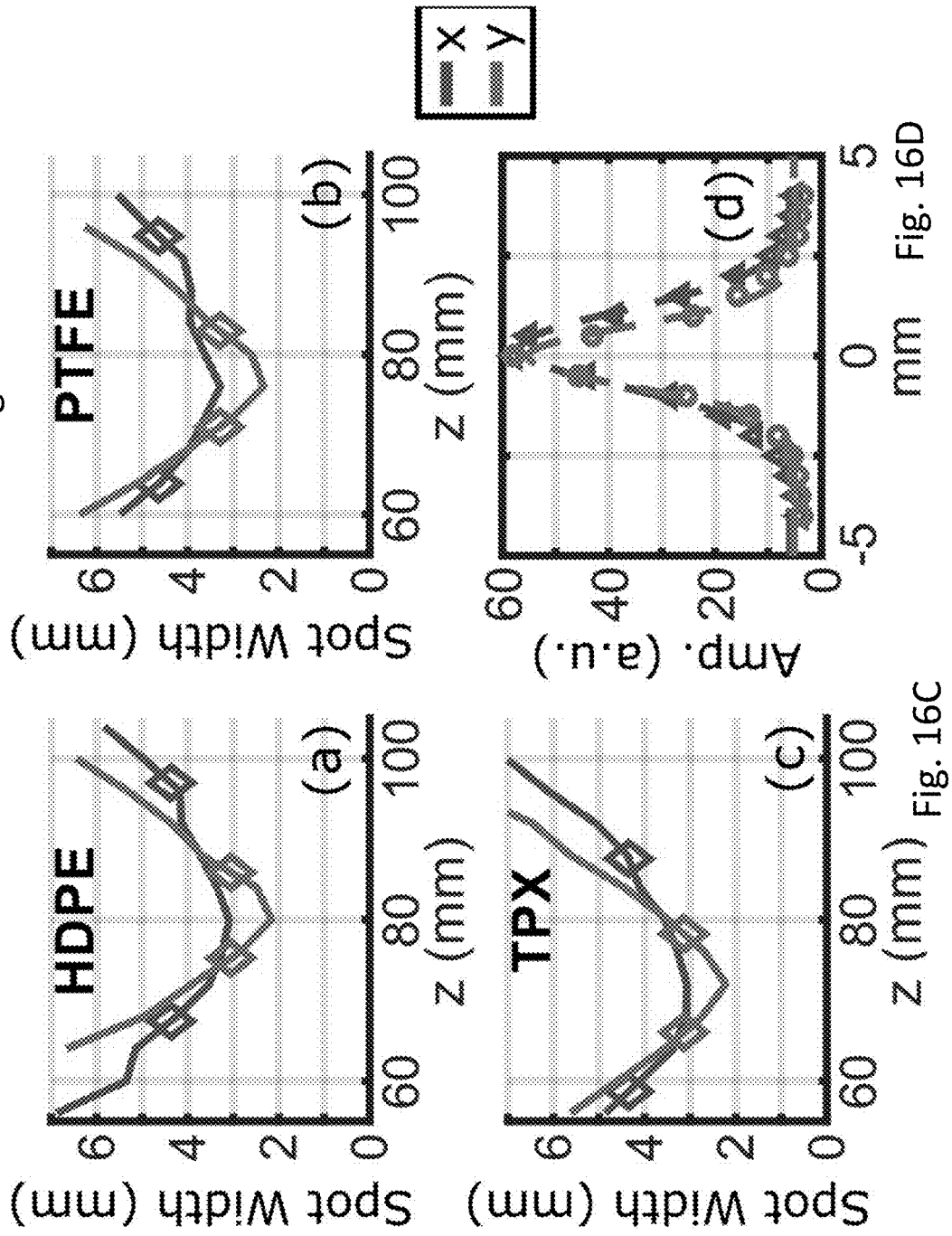
FIGS. 16A-16C illustrate the spot size for three f-theta focusing lenses.
FIG. 16D illustrates an example of a spot width with a gaussian distribution.

FIGS. 16A-16C show the measured spot sized of each of the f-θ lenses. The z-position is the distance from the GM. The blue curves represent the x direction and the red curves represent the y direction. The diamond shaped markings on each curve represent the depth of focus in the respective directions. While all three f-θ lenses have the same nominal focal length, the observed difference in the measured position of the focuses agrees with the simulations in FIGS. 14B-14D.

The depth of focus was calculated by finding the positions in z where $D(\pm z_R)=D_0\sqrt{2}$ is the beam waist diameter, $D_0=D(0)$ is the waist diameter at the focus, and $z_R$ is the Rayleigh length in either direction.

The spot size was determined from the processed time series data by finding a distance between two points on opposite sides of a maximum where the amplitude of the signal fell to 1/e (amplitude of the signal is proportionate to the electric field), e.g., peak-to-peak amplitude.

The spot size in the x-direction was a different length than the spot size in the y-direction. This was due to the emitted beam from the PCA had a non-circular cross section. Knife-edge measurements showed that the THz beam emitted from the PCA had a non-circular cross-section producing a collimated beam of 10.6 mm and 16.2 mm across in the horizontal (x) and vertical (y) directions, respectively, and non-circular foci for all lenses.

A spot size variation over the scanning field was measured with the detector at Det position 1 by deflecting the beam where the detector was positioned at the focus point for the different f-θ lenses and generating images.

FIG. 16D shows that a cross section of the amplitude at the focus of the lens (e.g., HDPE lens) is a Gaussian beam shape. The focus of the lens being the smallest point as shown in FIG. 6A.

FIGS. 17A-17D show the shapes of these spots at 0.3, 0.5 and 1.0 THz for both an un-deflected beam and at the maximum deflection angle achievable using the GM used in the testing. The maximum deflection angle is impacted by the maximum angles of rotation in both axes. A maximum deflection angle is a maximum angle you can deflect the beam without being clipped by edges of the lens 10 (or lens holder), or that can be supported by the gimbaled mirror maximum deflection. The smaller maximum 0 for the TPX50 lens is due to the size of the lens and focal length. The maximum deflection angle was limited by the GM (e.g., 17) for the other lenses. If a different GM was used, the maximum deflection angle would have been higher (limited by the lens or lens holder). In each figure, the values are normalized by the maximum amplitude to emphasize the beam shape.

Figures 17A, 17B, 17C, 17D:
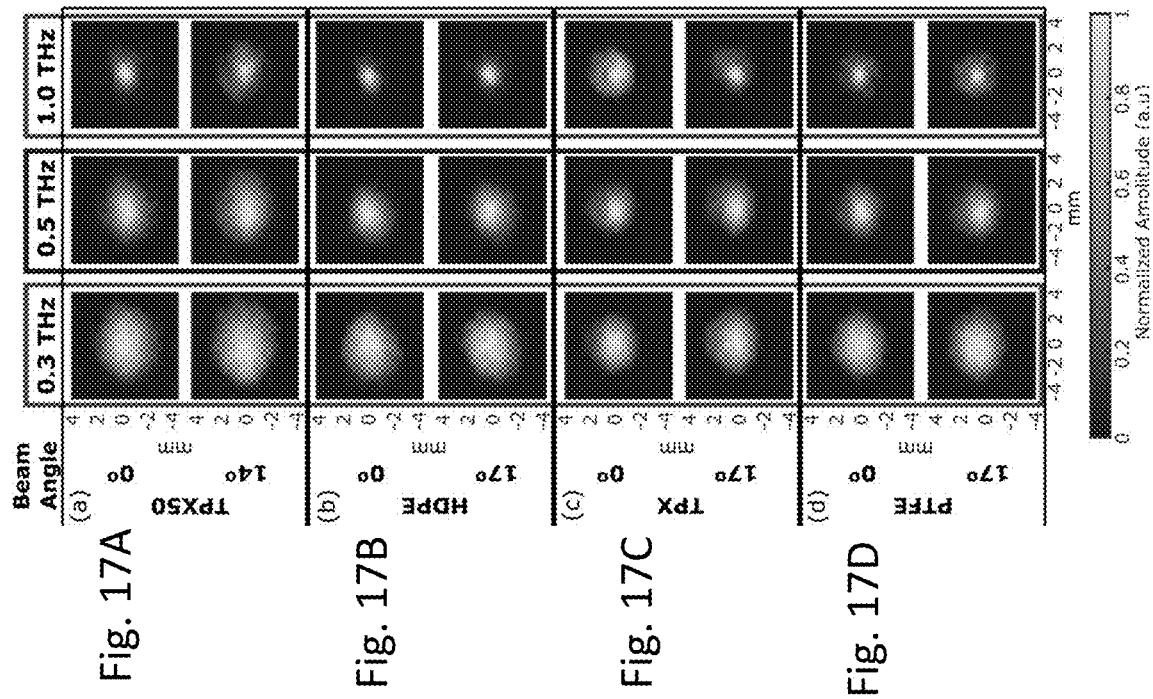
FIGS. 17A-17D illustrate test results of a spot size for the four different focusing lenses as a function of deflection angle and frequency.

FIG. 17A shows the shape of the spot size for the TPX50 lens; FIG. 7B shows the shape of the spot size for the HDPE f-θ lens; FIG. 17C shows the shape of the spot size for the TPX f-θ lens; and FIG. 17D shows the shape of the spot size for the PTFE f-θ lens. While the shape for all three f-θ lenses remains nearly constant between the two deflections, the focus of the TPX50 lens is larger when the beam is deflected.

Figures 18A, 18B, 18C, 18D:
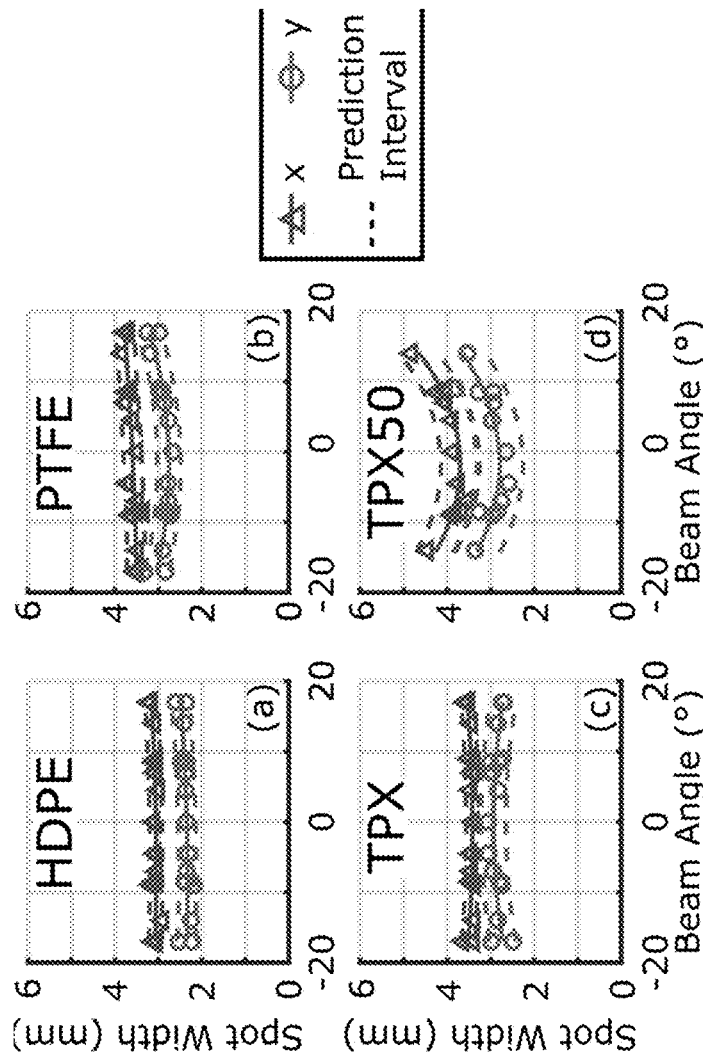
FIGS. 18A-18D illustrate test results of a spot width for the four different focusing lenses as a function of deflection angle.

This is confirmed by FIGS. 18A-18D which shows the spot width with respect to the deflection angles for both the x-direction and the y-direction. The width was determined using the peak-to-peak amplitude over the full range of the deflection angle. In FIGS. 18A-18D, the blue curve with triangles is the x-direction and the red curve with the circles is the y-direction. The prediction interval is an estimation of a range of values one would see given the values in the testing. The interval is based on a fit to the data. FIG. 8A is for the HDPE f-θ lens; FIG. 18B is for the PTFE f-θ lens; FIG. 18C is for the TPX f-θ lens; and FIG. 18D is for the conventional plano convex lens (TPX50). Importantly, all three f-θ lenses maintain approximately the same spot width over the beam deflection range, while the TPX50 spot size increases by 26% in the x- and 35% in the y-directions.

At θ=0°, the focused THz amplitude for the f-θ lenses were comparable with that of the TPX50 lens, but while at maximum deflection, the focus is clearly deformed for the TPX50. For example, while at maximum deflection the amplitude increased compared to θ=0° by 1.4% for the HDPE, 2.6% for the TPX, and decreased by 8.9% for the PTFE f-θ lenses, it was significantly reduced by 18.5% for the TPX50 lens.

The linearity of the focus position verses the beam angle was then determined. Of note, one of the defining features of an f-θ lens is the linearity of focus position with the beam angle. The detector-pinhole pair was raster scanned with 0.2 mm pixel size and 2 mm scan range around the maximum amplitude position at each deflection angle. The exact position of the focus in the x-y plane was extracted as a function of deflection angle between ±17° for the f-θ lenses, and ±14° for the TPX50. FIG. 19A shows the peak-to peak amplitude as a function of the angle for the four lenses. FIG. 19B shows the focus position as a function of angle for the four lenses. As expected, the focus position focus position appears to change linearly for all four lenses over the deflection range. For a plano-convex lens the expected response is f×tan(θ), as compared to the f×≥ response for the other three lenses. For the TPX50 the difference between the linear and non-linear responses, or f×(tan(θ)−θ), at θ=14° is about 0.25 mm. The larger slope for the TPX50 is expected given the longer focal length. In FIG. 19B, inset is a zoomed in view of the beam angle for a sub-set of the angles.

Figure 20:
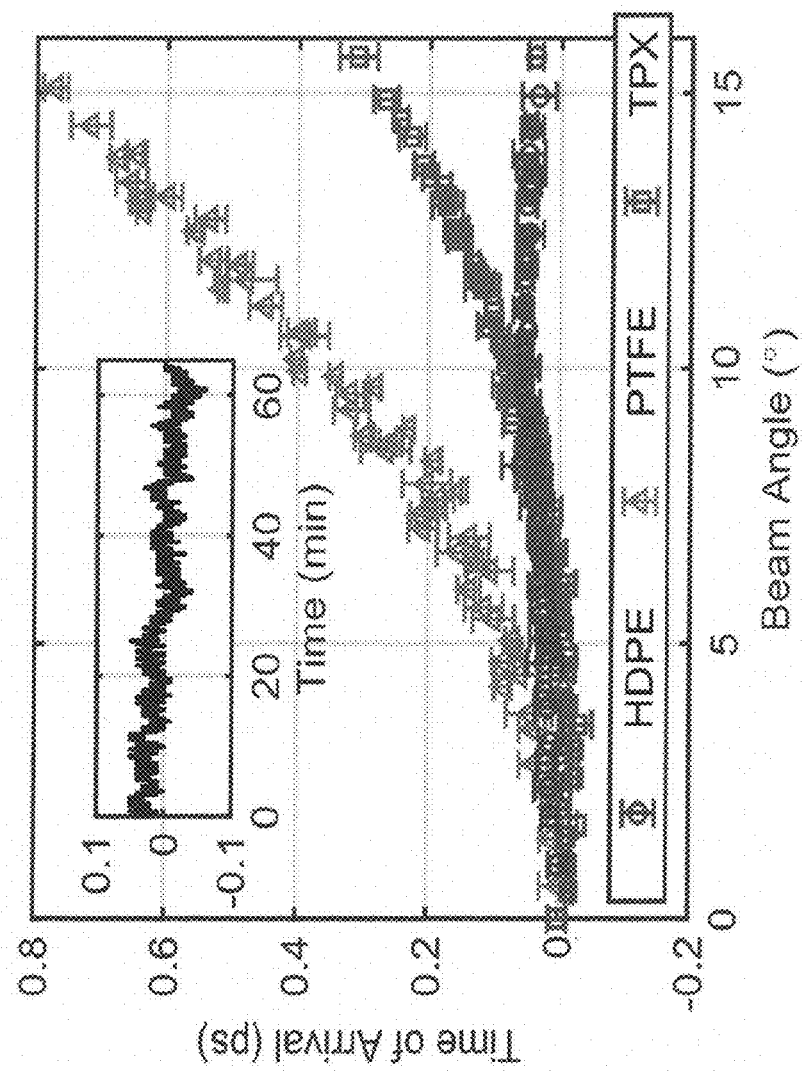
FIG. 20 illustrates the time of arrival verses angle of deflection for the f-theta focusing lenses.

The time of arrival verses beam angle was evaluated for the lenses. The detector was at Det. Pos. 2 as shown in FIG. 15. Ideally, a flat target would produce constant TOA values for all angles of the beam deflection. This property, when combined with the consistent spot-size, would allow for direct comparison of the phase information between two scanned positions. FIG. 20 shows the time of arrival (TOA) in ps as a function of beam angle for the f-theta lens. The error bars represent the standard deviations of TOA in all pixels with the same deflection angle. The inset in FIG. 20 shows the drift in the TOA of a fixed point of a flat mirror (θ=0°) during a continuous measurement over 60 minutes. The approximately 0.1 picosecond drift appears to be largely due to the cavity instability of the two 1550 nm femtosecond fiber lasers.

As shown in FIG. 20, for the HDPE f-θ, the time of arrival remains the effectively the same, e.g., difference is less than 0.1 ps, which is within the absolute uncertainty of the laser system itself. While the TPX f-θ shows some variance with angle, the difference when the defection angle is less than about 10° is still less than 0.1 ps. which is within the absolute uncertainty of the laser system itself. Thus, while the HDFE f-θ lens performs better than the TPX and PTFE f-θ lenses, the other lenses may also be used. The PTFE lens at a larger deflection angle may require, post acquirement data correction.

The handheld terahertz scanner as shown in FIG. 1 was tested to image a target.

In the test, the THz beam is generated and detected by photoconductive antennas, each of which was paired with a 50 mm focal length TPX lens. The collimated beam passes through the beam splitter and was steered from the rear focus of the lens using a mirror mounted on a motorized gimbal (T-OMG, Zaber Technologies Inc. Vancouver, BC Canada) controlled by computer (not shown). The focusing lens was a density polyethylene (HDPE) f-θ lens which focuses the beam perpendicular to the target plane. A silicon beam splitter was used to direct the reflected beam to the detector. The stationary mirror allows for the handle to contain both the emitter and detector. The emitter and detector are part of a commercial Asynchronous Optical Sampling system (TERA ASOPS, Menlo Systems Inc., Newton, NJ, USA) which also controls data acquisition. A cable bundle carrying the 1550 nm fiber-optic cables with the power and data cables for the motor and photoconductive antennas connect the device to a tower containing the computer and laser systems.

The mirror 15 was configured as described in FIG. 4A and steered based on the corresponding equations described above for that orientation.

For each pixel, a number of waveforms were recorded (20 waveforms) and were averaged. Different resolutions were obtained such as 1 mm pixels ($1^{st}$ resolution) and 0.25 mm pixels ($2^{nd}$ resolution). The imaging region for the test was 12×19 mm. The scanning time depended on the resolution. For example, the scan time for the first resolution was 2 minutes whereas the time for the second resolution was 30 minutes.

In an aspect of the disclosure, the resolution/scan time may be set by the user or operator and is not limited to the tested values.

Figure 21:
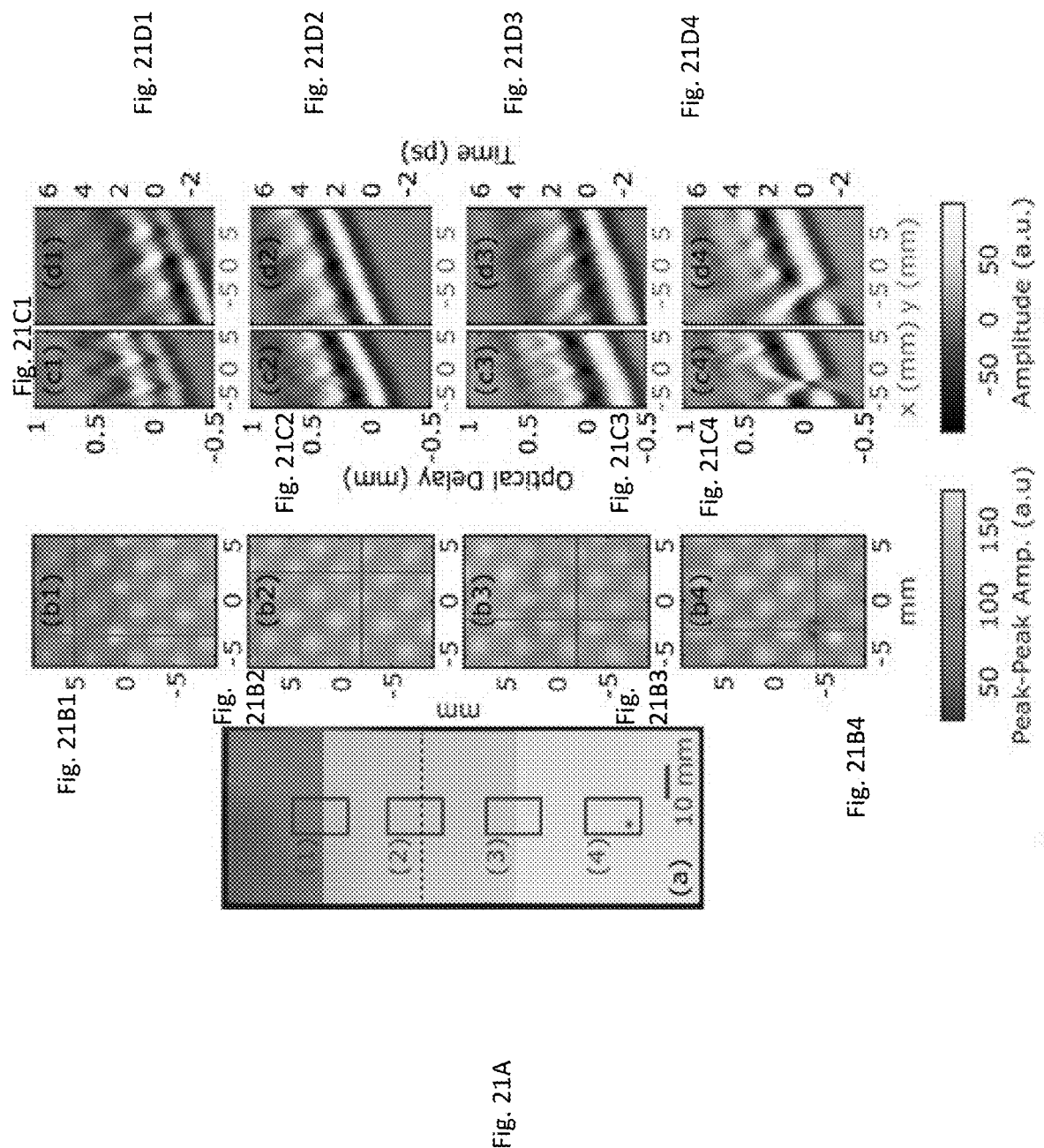

FIG. 21A illustrates photograph of an aircraft wing (target). The dotted line in FIG. 21A shows a separation between two sections which had roughly the same color. Four regions of the wing were scanned. The regions are identified in FIG. 21A with rectangles and labeled 1-4. In region 4, the wing had a damaged area. The regions are masked to allow examination of different layers. Images were taken across boundaries of the locations to highlight different features. A line representative of 10 mm is shown on the photograph for size reference. FIGS. 21B1-B4 are images of the four respective regions. These imaging were generated by determining peak-to-peak amplitudes. The images are in arbitrary units. As shown in FIGS. 21B1-B4, the pattern of the substrate (dots) is seen to the handheld terahertz scanner even though the wing is coated. As shown in FIG. 21B1, the different coatings are clearly seen, represented by the different color in the image (also shown in FIG. 21B3).

FIGS. 21C1-C4 are sectional views taken along the horizontal lines, respectively, in FIGS. 21B1-B4, e.g., time-domain traces. These images reflect depth in the target. The y-axis in the figures is the optical delay in mm.

FIGS. 21D1-D4 are sectional views taken along the vertical lines, respectively, in FIGS. 21B1-B4, e.g., time-domain traces. These images reflect depth in the image. The y-axis in the figures is the time ps (a measurement of delay).

The damaged can be seen in FIG. 21B4 (peak-to-peak image) as reflected in the blue spot and both the time-domain traces FIG. 21C4 and FIG. 21D4. Thus, the time-domain traces show that the damage extends into the substrate layer (delay in the initial reflection).

Housing

Figure 22:
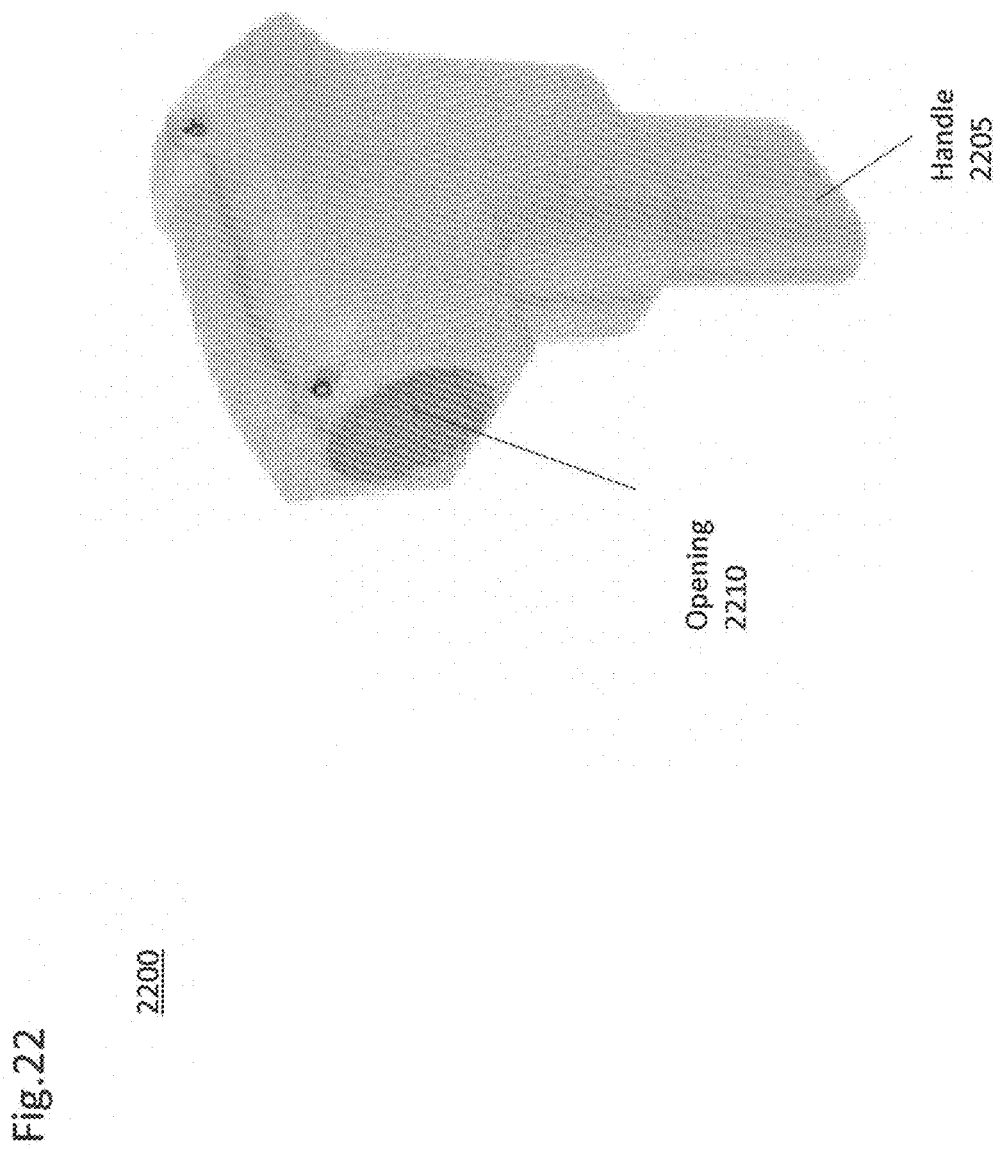
FIG. 22 illustrates the outside of a housing for the handheld terahertz scanner in accordance with aspects of the disclosure.
Figure 23:
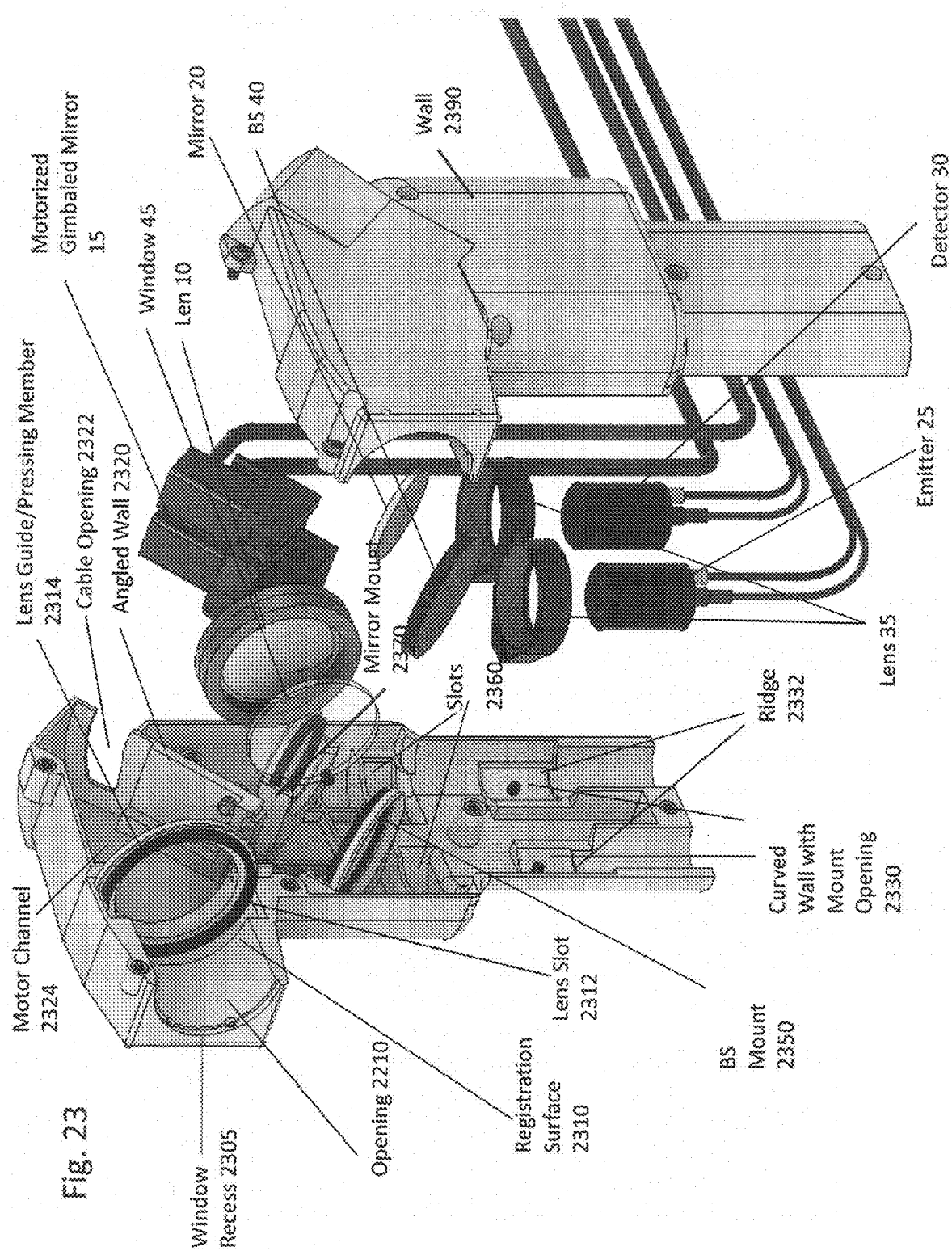
FIG. 23 illustrates an exploded view of the handheld terahertz scanner and housing of FIG. 22.

FIGS. 22-23 show views of a housing 2200 for a handheld terahertz scanner in accordance with aspects of the disclosure. The housing 2200 may be made via 3-D printing using plastic. However, in other aspects of the disclosure, the housing may be made using other methods such as but not limited to injection molding, The specific locations of mountings, slots, channel, such as the lens slot 2312 and the motor channel 2324 were determined in a manner described herein. The housing 2200 may have positional tolerances for various components. For example, the positional tolerances may be ±0.2 mm locally or ±0.001 mm/mm over the full size. Positions of certain optics within the housing 2200 may have flexible material such as a padding for sliding the same into position in the slot or mount or pressing the components into position in the housing 2200 and maintain position. The flexible material may be an elastomer. Components may be installed or replaced by inserting them into the predefined positions.

As shown in FIG. 22, the housing 2200 include a handle 2205 to hold the handheld device (scanner 1350). The position of the handle 2205 may be referred to as the proximal end of the scanner. In this configuration, the THz emitter 25 and the THz detector 30 are located within the handle region.

The housing 2200 has an opening 2210. The opening 2210 is configured and dimensioned to allow the scanner 1350 to emit light and receive light reflected by the target 50. The end with the opening is the distal end of the scanner 1350. The distal end may include a recess 2305 for placement of a window 45. The recess 2305 may be a thinner portion of an external wall 2390 of the housing 2210. The window 45 may be placed in the recess 2305 and locked into place using one or more screws inserted into defined positioned in the external wall 2390 of the housing 2200.

The housing 2200 has lens slot 2312. The position of the lens slot 2312 is based on the focal length of the lens 10, e.g., with respect to the distal end. The lens slot 2312 may include a thinner portion of the external wall 2390 of the housing. In an aspect of the disclosure, a distal portion of the slot 2312 may serve as a registration surface 2310 for the lens 10. A lens guide and pressing member 2314 may be positioned at the proximal side of the slot 2312. The lens guide is parallel to the registration surface 2310. The lens guide may be a projection from the inside surface of the wall 2390 of the housing 2200. In other aspects of the disclosure, the lens guide may be formed separate from the wall of the housing and inserted into the same.

The pressing member may be padding (such as an elastomer) attached to the lens guide. This padding presses the lens 10 when the lens is installed into the housing 2200 toward the registration surface 2310 to maintain the lens 10 in a fixed position. While the lens guide/pressing member 2314 is shown in FIG. 23 as being annular, in other aspects, of the disclosure, the lens guide/pressing member 2314 may have other shapes. Additionally, the lens guide/pressing member may not extend an entire circumference of the outer wall 2390. In other aspects of the disclosure, the location of the lens guide and registration surface may be reversed where the lens guide is distal and the registration surface is proximal.

The housing 2200 further has an angled wall 2320 extending inward from wall 2390 of the housing. The angled wall 2320 comprises a lip at one end. The angled wall 2320 has a mounting opening (hole) for mounting the motorized gimbaled mirror 15 thereto. When mounted, motorized gimbaled mirror 15 contacts the lip.

The wall 2390 and angled wall 2320 defines a motor channel 2324 (compartment) such that the motorized gimbaled mirror 15 is able to rotate in the manner described herein. The angled wall 2320 is dimensioned such that when the motorized gimbaled mirror 15 is mounted, a center of the mirror coincides with a focal point of the lens 10.

In an aspect of the disclosure, the housing 2200 may also comprise curved walls 2330, which match the shape of the THz emitter 25 and THz detector 30. As depicted, the location of these walls is in the handle area (handle 2205). In an aspect of the disclosure, the curved walls 2330 may be thicker portions of the wall 2390. In other aspects, the curved walls 2330 may be internal walls. In other aspects, the walls 2330 may be an insert, which are separated formed and attached to the wall 2390 of the housing. Each of these curved walls 2330 has mounting openings for respectively mounting the THz emitter 25 and THz detector 30. The shape of the walls 2330 is based on the type of emitter 25/detector 30. For example, for a PCA, the wall 2330 may be cylindrical.

The housing 2200 may also have a ridge 2332 at a proximal end of the curved wall 2330, respectively. These ridges 2332 serve to prevent rotation of the THz emitter 25 and THz detector 30 when mounted.

The housing 2200 may also have a beam splitter mount 2350 (BS mount) positioned between the curved wall for the emitter and spaced from the motorized gimbaled mirror 15. The BS mount may be formed from projections from the wall 2390 of the housing. The projections may form walls of the mount to create a pocket for the beam splitter. Each projection may be annular. The BS mount 2350 may be angled with respect to the longitudinal axis of the curved wall for the emitter. In an aspect of the disclosure, the BS mount 2350 may have a 45° angle with respect to the longitudinal axis. One of the walls of the BS mount 250 may have padding (such as an elastomer) in a similar manner as the lens slot 2312. When the beam splitter 40 is installed in the BS mount 2350, the padding presses the splitter 40 into the other wall to maintain the same in a fixed position. In an aspect of the disclosure, the wall 2390 of the housing may have a small opening in a corresponding position. This opening may help removal of the beam splitter 40 from the BS mount 2350 by inserting an objected from the outside into the opening and pressing the beam splitter 40 for removal.

The housing 2200 may also comprise a mirror mount 2370 for the stationary mirror 20. The mirror mount 2370 may be aligned with the BS mount 2350. The mirror mount 2370 may also have a corresponding angle as the angle of the BS mount 2350. In an aspect of the disclosure, the mirror mount 2370 may have a wall projected inward from the wall 2390. The mirror mount 2370 may also have a second projection spaced from the wall. The second projection may be annular or semi-annular. The second projection provides a ridge. When installed, the mirror 20 is sandwiched between the wall and the second projection. In other aspects, the mirror mount 2370 (walls and ridge) may be separated formed and attached to the wall 2390 of the housing. Padding may be attached to a wall of the mirror mount. In some aspects, the wall of the mirror mount 2370 may extend the entire length of the mirror 20 when inserted. In other aspects, the wall may form a rim and only extend along the edge of the mirror (similar to the lens guide).

The housing 2200 may also have additional slots 2360 for the lenses 35. The slots 2360 are respectively located between the curved wall for the emitter and the BS mount 2350 and the curved wall for the detector and the mirror mount 2370.

The housing 2200 also has a cable opening 2322. This opening 2322 is adjacent to the compartment (motor channel 2324) and is dimensioned for the motor data and power cables 1310. The dimensions of the cable opening also allows for the cables to rotate as the motors rotate. The opening 2322 is also for air cooling of the motors.

The proximal end of the device may also have respective openings for the cables (fiber optic cables, power and signal cables). An internal wall within the handle area may divide the housing into two channels for the cables, one for the THz emitter 25 and the other for the Thz detector 30.

In accordance with aspect of the disclosure, a handheld terahertz scanner 1350 may be manufactured to be about 262×155×74 mm and about 1.1 kg with the components.

Figure 24:
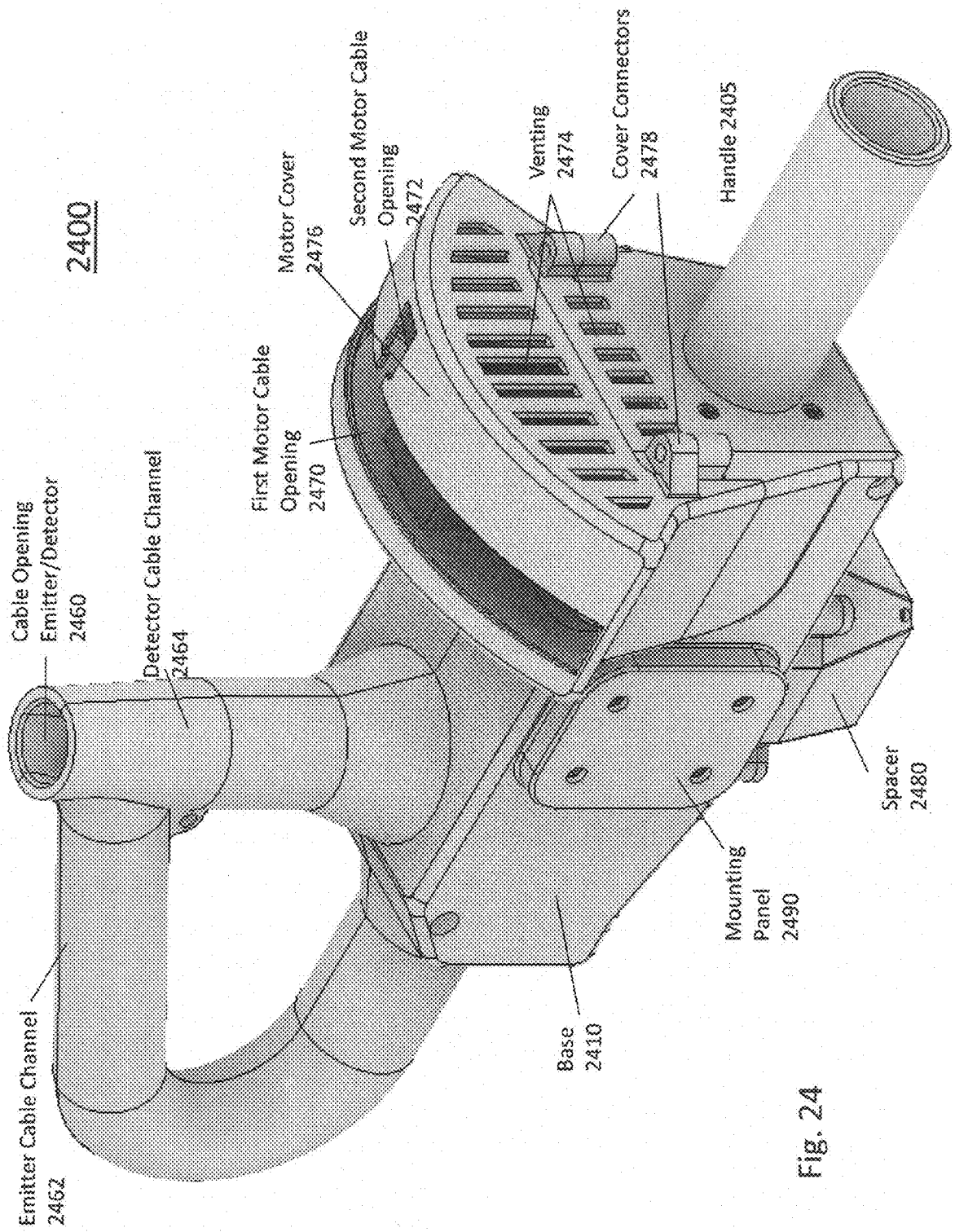
FIG. 24 illustrates the outside of a housing for the handheld terahertz scanner in accordance with other aspects of the disclosure.
Figure 25:
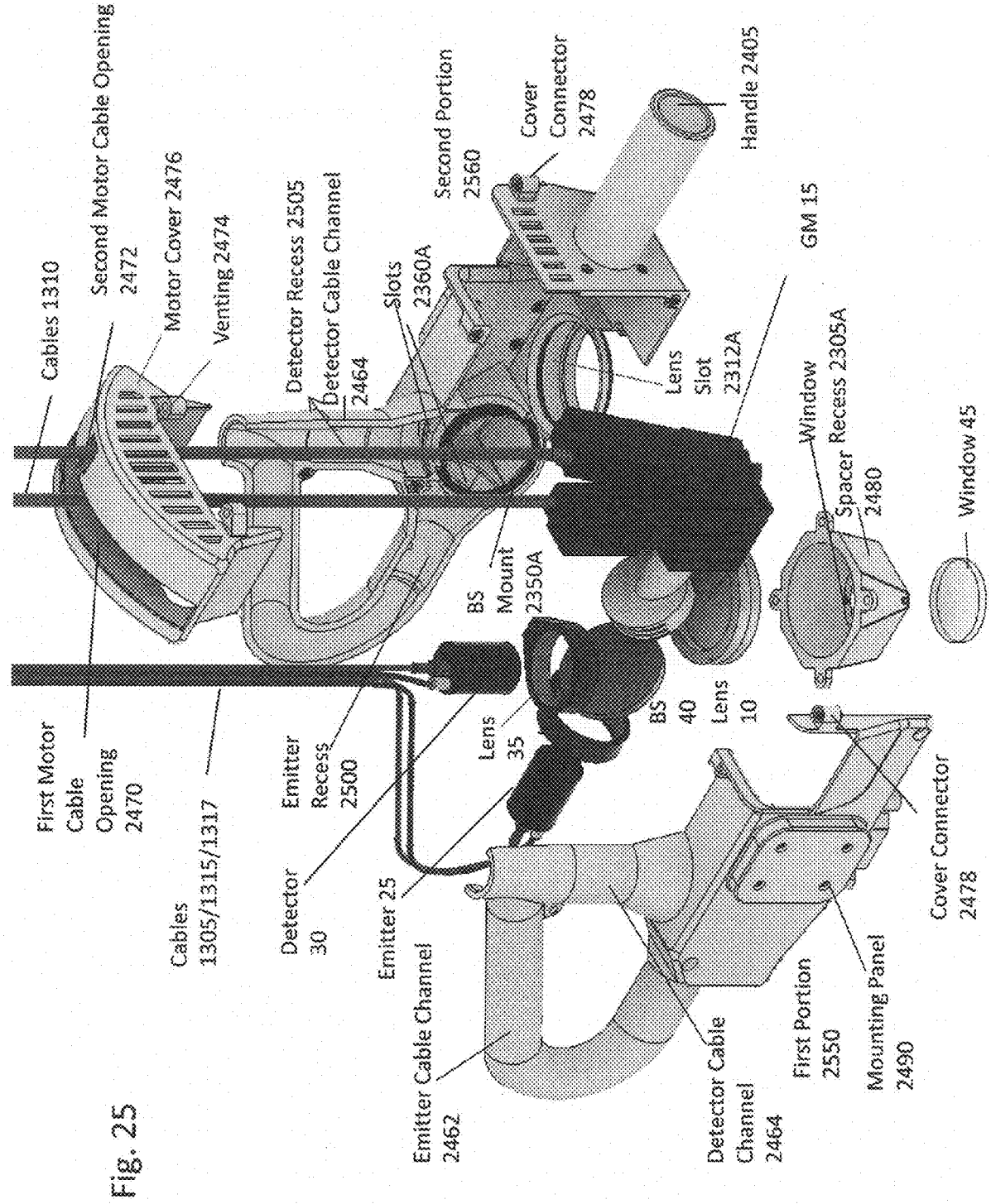
FIGS. 25-26 illustrate exploded views of the handheld terahertz scanner and housing of FIG. 24.
Figure 26:
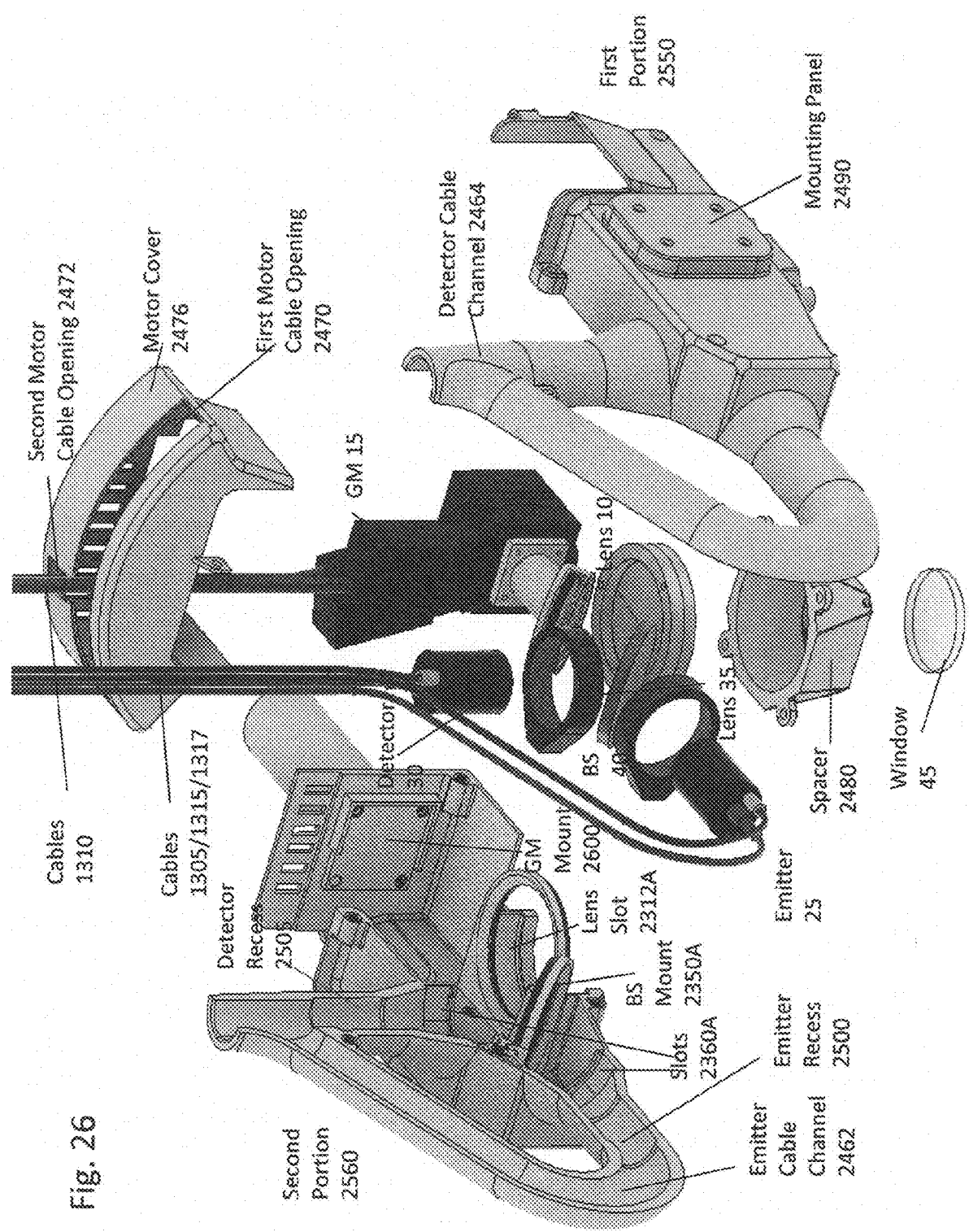

FIGS. 24-26 show views of a housing 2400 for the handheld terahertz scanner in accordance with other aspects of the disclosure. Like housing 2200, this housing 2400 may also be made via 3-D printing using plastic. However, in other aspects of the disclosure, the housing may be made using other methods such as but not limited to injection molding. The specific locations of mountings, slots, channels, were determined in a manner described herein. The housing 2400 was designed to support the motorized gimbaled mirror 15 in the orientation depicted in FIG. 8.

Positions of certain optics within the housing 2400 may have flexible (elastomer) material such as a padding for sliding the same into position in the slot or mount or pressing the components into position in the housing 2400 and maintain position. Components may be installed or replaced by inserting them into the predefined positions.

The housing 2400 comprises a base 2410, a motor cover 2476 and a spacer 2480. The spacer 2480 may be mounted to the bottom of the base 2410. The motor cover 2476 may be mounted on top of the base 2410. Bottom and top refer to directions in the orientation that the handheld terahertz scanner will be used. The base 2410 may have a first portion 2550 and a second portion 2560 as shown in FIGS. 25 and 26.

The base 2410 may have a handle 2405. In other aspects, the handle may be located on the motor cover 2476. The handle 2405 may extend from a wall of the housing. In an aspect of the disclosure, the handle 2405 is cylindrical. A gimbaled mirror mount 2600 (GM mount) is located on the inside of the same wall. The GM mount 2600 may comprise multiple projections from the wall. The projections form a slot or frame from the gimbaled mirror. For example, the frame may match the shape of one of the motors in the gimbaled mirror 15, e.g., motor 1210. The wall has mounting holes for screws or other mounting means, e.g., bolts, etc. The base 2410 has a space for the gimbaled mirror to extend away from the wall. In an aspect of the disclosure, when the gimbaled mirror 15 is mounted in the GM mount 2600, the motors are stacked where the cables 1310 extend substantially vertically. The longest dimension of the motors is also vertical when mounted. At least a portion of the frame 1215 extends normal to the wall and the mirror has the offset described above.

The wall also has venting 2474. In an aspect of the disclosure, the venting may be slots or channels within the wall.

The motor cover 2476 may have first and second cable openings 2470, 2472 for the cables (motor cables). The first cable opening 2470 and the second cable opening 2472 may be orthogonal to each other as shown. In an aspect of the disclosure, the first cable opening 2470 extends from one side of the base to the other. The first cable opening 2470 corresponds with the motor 1205 and the second cable opening 2472 corresponds with motor 1210. The first cable opening 2470 allows for the movement of the cable when the motor 1205 rotates. The motor cover 2476 may also have venting 2474. The venting allows for heat from the motors to escape the housing 2400. The motor cover 2476 may also have two connectors, one for connecting with the first portion 2550 and one for connecting with the second portion 2560. The first portion 2550 and the second portion 2560 have a corresponding connector (cover connectors 2478). These connectors align when the cover 2476 is mounted to the base 2410.

The base 2410 also has an THz emitter cable channel 2462 and a THz detector cable channel 2464. These channels 2462, 2464 extend from the same opening 2460 (cable opening). The channels 2462, 2464 are bound by a wall of the base.

The opening 2460 may be dimensioned for receiving fiber optic cables 1305 for both the THz emitter 25 and the THz detector 30, power cable(s) 1315 for the THz emitter and signal/data cable(s) for the THz detector. The THz detector cable channel 2464 is dimensioned for receiving fiber optic cable(s) 1305 for the THz detector 30 and signal/data cable(s) for the THz detector. The THz emitter cable channel 2462 is dimensioned for receiving fiber optic cable(s) 1305 for the THz emitter 25 and power cable(s) 1315.

In an aspect of the disclosure, the THz detector cable channel 2464 is substantially straight, whereas the THz emitter cable channel 2462 is curved. However, in other aspects of the disclosure, the channels may be reversed where the detector cable channel 2464 is curved and the emitter cable channel 2464 is substantially straight.

The base 2410 has an emitter recess 2500 and a detector recess 2505. The emitter recess 2500 may be located at an end of the emitter cable channel 2462 and the detector recess 2505 may be located at an end of the detector cable channel 2464. In an aspect of the disclosure, the recesses 2500, 2505 may be formed from thinner portions of a wall of the base. The shape of the recess may match the shape of the THz emitter 25 and the THz detector 30. For example, when a PCA is used for the THz emitter and THz detector, respectively, the shape of the recess may be cylindrical. The longitudinal dimension of the recess may be the same as the longitudinal dimension of the PCA to prevent movement of the THz emitter 25 and the THz detector 30. Additionally, the depth of the recess may be determined by the diameter of the THz emitter 25/THz detector 30. For example, when the THz emitter 25/THz detector 30 is mounted into the housing 2400, the dimensions of the recess 2500, 2505 may provide a pressure fit such that movement is prevented.

In some aspects of the disclosure, the base 2410 may also have slots 2360A for lenses 35. Since these lenses 35 may be omitted in certain embodiments, e.g., where the emitted beam is collimated, the slots 2360A may also be omitted. The slots 2360A may be respectively positioned adjacent to the THz emitter 25 and THz detector 30. The specific distance between the slots 2360A and THz emitter 25/THz detector 30 may be based on the properties of the lenses 35. In some aspects, the radial width (diameter) of the lenses 35 are larger than the diameter of the THz emitter 25/THz detector 30 and therefore, the diameter of the base may increase from the recesses 2500, 2505, respectively toward the slots 2360A. The slots 2360A may be formed from a recess in a wall of the base. The slots 2360A may also be formed (defined) by one or more projections from the wall. For example, the slots 2360A may have side walls which are the projections. Further, a distal portion (with respect to the THz emitter 25/THz detector 30) may have a projection in a shape of a ridge to prevent axial movement of the lens 35 when mounted.

The base 2410 of the housing 2400 may also have a beam splitter mount 2350A (BS mount). The BS mount 2350A may be formed in the same manner as described above, e.g., formed from projections of a wall, e.g., a base wall. The BS mount 2350A is angled with respect to both the longitudinal axis of the emitter and detector recesses 2500, 2505. In an aspect of the disclosure, the BS mount 2350A may have a 45° angle with respect to both the longitudinal axes.

The housing 2400 also may have lens slot 2312A for lens 10. In an aspect of the disclosure, the lens slot 2312A may be on the bottom of the base 2410. The lens slot 2312A may be orthogonal to the wall having the GM mount 2600.

The position of the lens slot 2312A may be such that when the GM 15 is installed and mounted to the GM mount 2600, the center of the mirror 1200 is aligned with the center of the lens slot 2312A. Additionally, the distance between the center of the lens slot 2312A and the center of the mirror 1220 may be determined based on the focal length of the lens 10. The lens slot 2312A has a registration surface for the lens and a lens guide. In some aspects of the disclosure, the lens guide has a pressing member such as an elastomer material. The lens guide may have a ring like shape. The registration surface may be annular. The axial dimension of the lens slot 2312A may be based on the axial dimension of the collar 300 of the lens 10.

The pressing member may be padding attached to the lens guide. This padding presses the lens 10 when the lens is installed into the housing 2400 toward the registration surface to maintain the lens 10 in a fixed position.

The spacer 2480 has openings on the distal and proximal side. The openings may be dimensioned to allow light emitted by the THz emitter and reflected light to pass, e.g., enter and leave the scanner. The distal end may include a recess 2305A for placement of a window 45. The recess 2305A may be a thinner portion of a wall of the spacer 2480. The window 45 may be placed in the recess 2305A and locked into place using one or more screws inserted into defined positioned in the wall of the spacer 2480.

The axial length of the spacer may be determined based on the focal length of the lens 10. The spacer 2480 is configured to maintain a constant distance between the lens 10 and the target 50.

The base 2410 may have a mounting panel 2490. The mounting panel 2490 is optional. The mounting panel 2490 is for receiving a structure to mount the scanner to a wall or a frame. As depicted, the mounting panel 2490 has four mounting openings. A wall mount or frame mount may be attached to the panel 2490 via the mounting openings.

The terminology used herein is for the purpose of describing particular aspects only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description has been presented for purposes of illustration and description, but is not intended to be exhaustive or limited to the invention in the form disclosed. Many modifications and variations will be apparent to those of ordinary skill in the art without departing from the scope and spirit of the invention. The aspects were chosen and described in order to best explain the principles of the invention and the practical application, and to enable others of ordinary skill in the art to understand the invention for various embodiments with various modifications as are suited to the particular use contemplated.

What is claimed is:

1. A handheld, broadband terahertz (THz) multiple dimensional scanner comprising:
   a lens for focusing light on a target, the lens being fixed in a position in a housing;
   a 2-Dimensional (2D) gimbaled mirror, the 2D gimbaled mirror comprising a single mirror mounted in a frame, a first motor and a second motor, the first motor and the second motor coupled to the frame, the mirror rotatable in a first axis of rotation and a second axis of rotation under a control of a motor controller and a system controller to control the single mirror to execute a point scan of light on the target in two dimensions per a scan of the target, the first motor corresponding to the first axis and the second motor corresponding to the second axis, the single mirror positioned at a focus of the lens;
   an emitter configured to emit the light which is incident on the single mirror and the target; and
   a detector configured to detect light reflected from the target.

2. The handheld, broadband terahertz (THz) multiple dimensional scanner of claim 1, wherein the lens is a rotationally-symmetric f-θ lens.

3. The handheld, broadband terahertz (THz) multiple dimensional scanner of claim 2, wherein the rotationally-symmetric f-θ lens is formed from a high-density polyethylene.

4. The handheld, broadband terahertz (THz) multiple dimensional scanner of claim 2, wherein the rotationally-symmetric f-θ lens has a bandwidth of about 0.1 to about 1.6 THz.

5. The handheld, broadband terahertz (THz) multiple dimensional scanner of claim 4, wherein the rotationally-symmetric f-θ lens has a center frequency of about 0.5 THz.

6. The handheld, broadband terahertz (THz) multiple dimensional scanner of claim 4, wherein the rotationally-symmetric f-θ lens has a depth of focus of at least 2 mm.

7. The handheld, broadband terahertz (THz) multiple dimensional scanner of claim 1, wherein a time of arrival of the reflected light at the detector is substantially independent of angles of rotation.

8. The handheld, broadband terahertz (THz) multiple dimensional scanner of claim 1, wherein a spot size of the light at a focal length of the lens is substantially independent of angles of rotation.

9. The handheld, broadband terahertz (THz) multiple dimensional scanner of claim 1, further comprising a beam splitter positioned to direct a portion of the light emitted by the emitter toward the single mirror and a portion of the reflected light by the target toward the detector.

10. The handheld, broadband terahertz (THz) multiple dimensional scanner of claim 1, wherein the emitter comprises a photoconductive antenna and the detector comprises a photoconductive antenna.

11. The handheld, broadband terahertz (THz) multiple dimensional scanner of claim 10, wherein the photoconductive antennas are configured to be excited at a wavelength range selected from a group consisting of 1300, 1550 and 1600 nm.

12. The handheld, broadband terahertz (THz) multiple dimensional scanner of claim 11, wherein the emitter and the detector are coupleable to respective fiber optic cables.

13. The handheld, broadband terahertz (THz) multiple dimensional scanner of claim 1, wherein angles of rotation to direct light to a specific position on the target is based on a relationship between the first axis and the second axis of rotation, the light, and properties of the lens.

14. The handheld, broadband terahertz (THz) multiple dimensional scanner of claim 1, further comprising a fixed mirror positioned to direct the light reflected from the target toward the detector.

15. The handheld, broadband terahertz (THz) multiple dimensional scanner of claim 1, wherein the first motor and the second motor are connected to the frame such that steering of the light by the first axis is substantially uncoupled from steering of the light by the second axis.

16. The handheld, broadband terahertz (THz) multiple dimensional scanner of claim 15, wherein angles of rotation to direct light to a specific position on the target is based on properties of the lens.

17. The handheld, broadband terahertz (THz) multiple dimensional scanner of claim 1, wherein the emitter and the detector are positioned orthogonal from each other.

18. The handheld, broadband terahertz (THz) multiple dimensional scanner of claim 1, further comprising a collimating lens positioned adjacent to the emitter and detector, respectively.

19. The handheld, broadband terahertz (THz) multiple dimensional scanner of claim 1, wherein the first axis is orthogonal to the second axis.

20. A broadband terahertz (THz) multiple dimensional imaging system comprising:
   a handheld scanner comprising:
      a lens for focusing light on a target;
      a 2-Dimensional (2D) gimbaled mirror, the 2D gimbaled mirror comprising a single mirror mounted in a frame, a first motor and a second motor, the first motor and the second motor coupled to the frame, the mirror rotatable in a first axis of rotation and a second axis of rotation under a control of a motor controller and a system controller to control the single mirror to execute a point scan of light on the target in two dimensions to generate an image, the first motor corresponding to the first axis and the second motor corresponding to the second axis, the single mirror positioned at a focus of the lens;
      an emitter configured to emit the light which is incident on the single mirror and the target; and
      a detector configured to detect light reflected from the target;
   fiber optic cables connecting to the emitter and the detector;
   signal cable connected to the detector;
   power cable connected to the emitter;
   the motor controller coupled to the first motor and the second motor and the system controller, the motor controller configured to cause the first motor and the second motor to cause the mirror to rotate about the first axis and the second axis to execute the point scan of light on the target over a plurality of different positions in the two dimensions to create the image based on signals from the system controller,
   the system controller further configured to control the emitter to emit the light and generate the image of the target based on the reflected light; and
   a display for displaying the image of the target generated by the system controller.

21. The broadband terahertz (THz) multiple dimensional imaging system of claim 20, wherein the system controller is further configured to generate both 2-Dimensional en-face images and 3-D dimensional images of the target.

22. The broadband terahertz (THz) multiple dimensional imaging system of claim 20, wherein the system controller is configured to scan the target using different scan modes, the scan modes including at least a first resolution mode and a second resolution mode, wherein in the first resolution mode, a pixel size of the image is smaller than in the second resolution mode.

23. The broadband terahertz (THz) multiple dimensional imaging system of claim 20, wherein a field of view of the system is at least 18 mm×12 mm.

* * * * *